United States Patent
Kotra et al.

(10) Patent No.: US 11,558,607 B2
(45) Date of Patent: Jan. 17, 2023

(54) ENCODER, A DECODER AND CORRESPONDING METHODS USING HISTORY BASED MOTION VECTOR PREDICTION

(71) Applicant: HUAWEI TECHNOLOGIES CO., LTD., Guangdong (CN)

(72) Inventors: Anand Meher Kotra, Munich (DE); Jianle Chen, San Diego, CA (US); Semih Esenlik, Munich (DE); Biao Wang, Shenzhen (CN); Han Gao, Munich (DE); Zhijie Zhao, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/351,783

(22) Filed: Jun. 18, 2021

(65) Prior Publication Data
US 2021/0360228 A1    Nov. 18, 2021

Related U.S. Application Data

(63) Continuation of application No. PCT/CN2019/126842, filed on Dec. 20, 2019.
(Continued)

(51) Int. Cl.
*H04N 19/105* (2014.01)
*H04N 19/129* (2014.01)
(Continued)

(52) U.S. Cl.
CPC ......... *H04N 19/105* (2014.11); *H04N 19/129* (2014.11); *H04N 19/176* (2014.11); *H04N 19/1883* (2014.11)

(58) Field of Classification Search
None
See application file for complete search history.

(56) References Cited

U.S. PATENT DOCUMENTS 10,362,330 B1 *  7/2019  Li ........................ H04N 19/176
10,491,902 B1 * 11/2019  Xu ....................... H04N 19/573
(Continued)

FOREIGN PATENT DOCUMENTS

CN    108293131 A     7/2018
EP     2744204 B1    12/2018
(Continued)

OTHER PUBLICATIONS

JVET-L0106, Yi-Wen Chen et al .,"CE4-related: Modified History-based MVP to suppod parallel processing",oint Video Experts Team (JVET) of ITU-T SG 16 WP 3 and ISO/IEC JTC 1/SC 29/WG 11,12th Meeting: Macao, CN, Oct. 3-12, 2018, total 3 pages.
(Continued)

*Primary Examiner* — Chikaodili E Anyikire
(74) *Attorney, Agent, or Firm* — Womble Bond Dickinson (US) LLP

(57) ABSTRACT

Embodiments provide methods and devices (encoder and/or decoder) of coding a picture. A History Based Motion Vector Prediction (HMVP) list for a current Coding Tree Unit (CTU) row within a tile of a picture is initialized and a CTU of the current CTU row is processed based on the initialized HMVP list.

19 Claims, 16 Drawing Sheets

Related U.S. Application Data

(60) Provisional application No. 62/792,856, filed on Jan. 15, 2019, provisional application No. 62/787,725, filed on Jan. 2, 2019, provisional application No. 62/784,338, filed on Dec. 21, 2018.

(51) Int. Cl.
*H04N 19/176* (2014.01)
*H04N 19/169* (2014.01)

(56) References Cited

U.S. PATENT DOCUMENTS

| | | | |
|---|---|---|---|
| 2018/0199052 A1 | 7/2018 | He | |
| 2020/0014948 A1* | 1/2020 | Lai | H04N 19/70 |
| 2020/0059658 A1* | 2/2020 | Chien | H04N 19/137 |
| 2020/0137398 A1* | 4/2020 | Zhao | H04N 19/159 |
| 2020/0186821 A1* | 6/2020 | Park | H04N 19/115 |
| 2020/0260107 A1* | 8/2020 | Han | H04N 19/96 |
| 2020/0359039 A1* | 11/2020 | Zhao | H04N 19/423 |
| 2020/0382770 A1* | 12/2020 | Zhang | H04L 65/70 |
| 2022/0014774 A1* | 1/2022 | Choi | H04N 19/172 |

FOREIGN PATENT DOCUMENTS

| | | |
|---|---|---|
| WO | 2018128071 A1 | 7/2018 |
| WO | 2020030187 A1 | 2/2020 |

OTHER PUBLICATIONS

Document: JVET-L0266-v1, Li Zhang et al, CE4: History-based Motion Vector Prediction (Test 4.4.7), Joint Video Experts Team (JVET) of ITU-T SG 16 WP 3 and ISO/IEC JTC 1/SC 29/WG 11, 12th Meeting: Macao, CN, Oct. 3-12, 2018, total 4 pages.
Document: JVET-M300-v3 , Jianle Chen et al., CE4-related: HMVP and parallel processing with tiles and tile groups, Joint Video Experts Team (JVET) ofITU-T SG 16 WP 3 and ISO/IECJTC 1/SC 29/WG 11, 13th Meeting: Marrakech, MA, Jan. 9-18, 2019, total 3 pages.
Document: JVET-L0359_r4, Yukinobu Yasugi et al., AHG12: Flexible Tile Splitting, Joint Video Experts Team (JVET) of ITU-T SG 16 WP 3 and ISO/IEC JTC 1/SC 29/WG 11, 12th Meeting: Macao, CN, Oct. 3-12, 2018, total 6 pages.
JVET-L0158, Naeri Park et al.,"CE4-related: History-Based Motion Vector Prediction considering parallel processing", oint Video Experts Team (JVET) of ITU-T SG 16 WP 3 and ISO/IEC JTC 1/SC 29/WG 11,12th Meeting: Macau, CN, Oct. 8-12, 2018, total 6 pages.
Document: JVET-L0106_WD, Yi-Wen Chen et al, CE4-related: Modified History-based MVP to support parallel processing, Joint Video Experts Team (JVET) of ITU-T SG 16 WP 3 and ISO/IEC JTC 1/SC 29/WG 11, 12th Meeting: Macao, CN, Oct. 3-12, 2018, total 6 pages.
Document: JVET-L0686-v2, Ye-Kui Wang et al, Spec text for the agreed stading point on slicing and tiling, Joint Video Experts Team (JVET) of ITU-T SG 16 WP 3 and ISO/IEC JTC 1/SC 29/WG 11, 12th Meeting: Macao, CN, Oct. 3-12, 2018, total 1 pages.
JVET-L0575-v2, Weiwei Xu et al.,"CE4-related: CTU-level Initialization of History-based Motion Vector Prediction",oint Video Experts Team (JVET) of ITU-T SG 16 WP 3 and ISO/IEC JTC 1/SC 29/WG 11,12th Meeting: Macao, CN, Oct. 3-12, 2018, total 6 pages.
Document: JVET-L1001-v6, Benjamin Brass et al., Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, total 203 pages.
ITU-T H.264(Apr. 2017), Series H: Audiovisual and Multimedia Systems, Infrastructure of audiovisual services—Coding of moving video, Advanced video coding for generic audiovisual services, total 812 pages.
ITU-T H.265(Feb. 2018), Series H: Audiovisual and Multimedia Systems Infrastructure of audiovisual services—Coding of moving video, High efficiency video coding, total 692 pages.
Xu (Huawei) W et al: "CE4-related: CTU-level Initialization of HistorybasedMotion Vector Prediction", 12. JVET Meeting; Oct. 3, 2018-Oct. 12, 2018; JVET-L0575-v1, 4 pages.

* cited by examiner

```
tile_group_data( ) {                                                                  Descriptor
    tileIdx = tile_group_address
    for( i = 0; i <= num_tiles_in_tile_group_minus1; i++, tileIdx++ ) {
        ctbAddrInTs = FirstCtbAddrTs[ tileIdx ]
        for( j = 0; j < NumCtusInTile[ tileIdx ]; j++, ctbAddrInTs++ ) {
            CtbAddrInRs = CtbAddrTsToRs[ ctbAddrInTs ]
            FirstCtbInCtuRowInTile = ( ( CtbAddrInTs − FirstCtbAddrTs[ tileIdx ] − NumCtusInTile[ tileIdx ] ) % CtbWidthC[ tileIdx ] == 0 ) ? 1 : 0
            if ( ( tile_group_type != I ) && ( FirstCtbInCtuRowInTile ) )
                NumHMVPCandNum = 0
            coding_tree_unit( )
        }
        end_of_tile_one_bit /* equal to 1 */                                          ae(v)
        if( i < num_tiles_in_tile_group_minus1 )
            byte_alignment( )
    }
}
```

FIG. 8

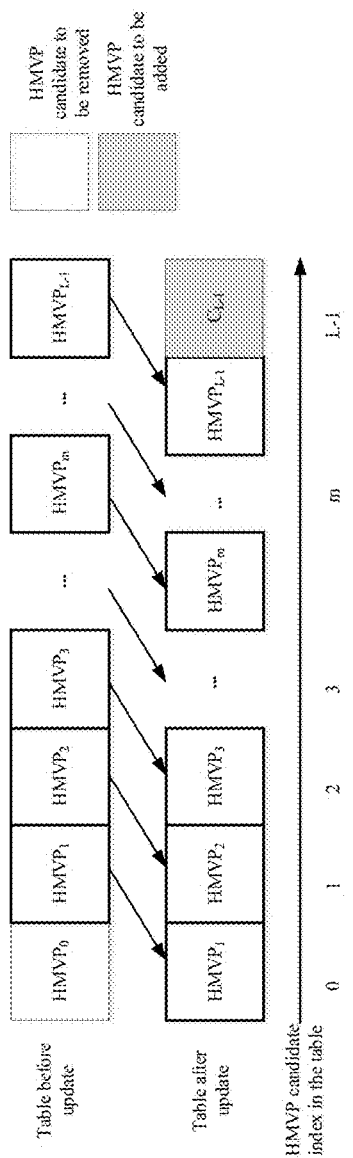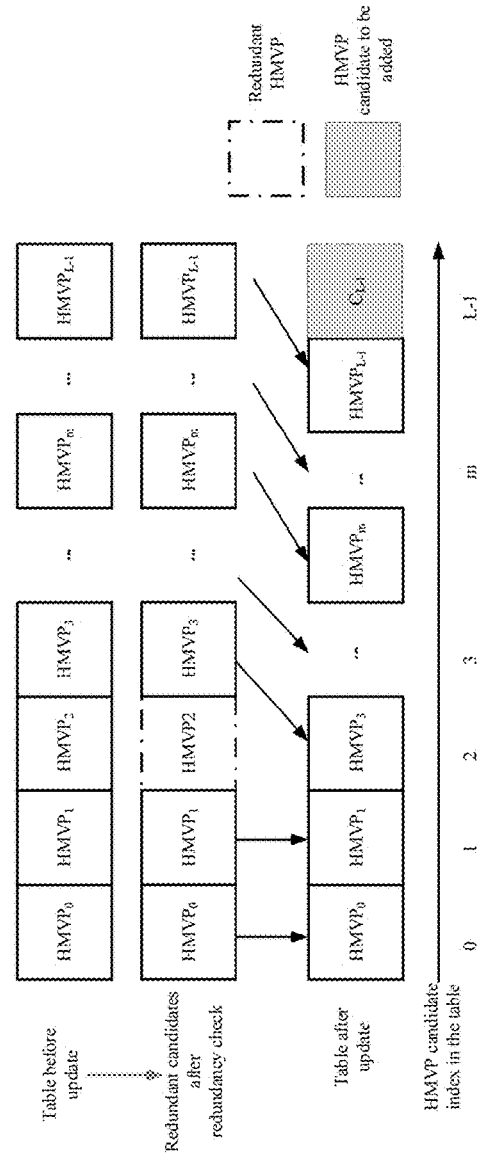
FIG. 12

| | Descriptor |
|---|---|
| tile_group_data( ) { | |
|   tileIdx = tile_group_address | |
|   for( i = 0; i <= num_tiles_in_tile_group_minus1; i++, tileIdx++ ) { | |
|     ctbAddrInTs = FirstCtbAddrTs[ tileIdx ] | |
|     for( j = 0; j < NumCtusInTile[ tileIdx ]; j++, ctbAddrInTs++ ) { | |
|       if ( j % ColWidth[tileIdx] == 0 ) | |
|         HMVPCandNum = 0 | |
|       CtbAddrInRs = CtbAddrTsToRs[ ctbAddrInTs ] | |
|       coding_tree_unit( ) | |
|     } | |
|     end_of_tile_one_bit /* equal to 1 */ | ae(v) |
|     if( i < num_tiles_in_tile_group_minus1 ) | |
|       byte_alignment( ) | |
|   } | |
| } | |
| tile_group_data( ) { | |

FIG. 14

| merge index | Bin String | | | | | | | | | |
|---|---|---|---|---|---|---|---|---|---|---|
| 0 | 0 | | | | | | | | | |
| 1 | 1 | 0 | | | | | | | | |
| 2 | 1 | 1 | 0 | | | | | | | |
| ... | | | | | | | | | | |
| 5 | 1 | 1 | 1 | 1 | 0 | | | | | |
| 6 | 1 | 1 | 1 | 1 | 1 | 0 | | | | |
| 7 | 1 | 1 | 1 | 1 | 1 | 1 | 0 | 0 | 0 | |
| 8 | 1 | 1 | 1 | 1 | 1 | 1 | 0 | 0 | 1 | |
| ... | | | | | | | | | | |
| 14 | 1 | 1 | 1 | 1 | 1 | 1 | 1 | 1 | 1 | |
| Bin index | 0 | 1 | 2 | 3 | 4 | 5 | 6 | 7 | 8 | 9 |

FIG. 15

ENCODER, A DECODER AND CORRESPONDING METHODS USING HISTORY BASED MOTION VECTOR PREDICTION

CROSS-REFERENCE TO RELATED APPLICATIONS

This application is a continuation of International Application No. PCT/CN2019/126842, filed on Dec. 20, 2019, which claims priority of U.S. Provisional Patent Application No. 62/784,338, filed on Dec. 21, 2018 and U.S. Provisional Patent Application No. 62/787,725, filed on Jan. 2, 2019 and U.S. Provisional Patent Application No. 62/792,856, filed on Jan. 15, 2019. All of the aforementioned patent applications are hereby incorporated by reference in their entireties.

TECHNICAL FIELD

Embodiments of the present application (disclosure) generally relate to the field of picture processing and more particularly to processing pictures using history based motion vector prediction (HMVP).

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

In view of the above-discussed problems the present disclosure provides a solution to mitigate or even remove the above-mentioned problem.

Embodiments of the present application provide apparatuses and methods for encoding and decoding according to the independent claims.

Embodiments facilitate efficient processing, e.g. parallel processing, of pictures using history based motion vector prediction. The scope of protection is defined by the claims.

Embodiments of the disclosure are defined by the features of the independent claims, and further advantageous implementations of the embodiments by the features of the dependent claims the description and the figures.

Particular embodiments are outlined in the attached independent claims, with other embodiments in the dependent claims.

For the present disclosure, the term "tile group" may also be spelled "tilegroup". The meaning of these two terms within the present disclosure is to be the same.

In an embodiment, the present disclosure provides: a method of coding a picture implemented by a decoding device, comprising: initializing a History Based Motion Vector Prediction, HMVP, list for a current Coding Tree Unit, CTU, row within a tile of a picture; processing a CTU of the current CTU row based on the initialized HMVP list.

Here, the HMVP list is initialized by setting the size of the list size to 0. This may be done by setting the variable NumHmvpCand to 0 via NumHmvpCand=0. Basically the number of valid candidates in the HMVP list, HMVPlist, is tracked using the variable NumHmvpCand and only the HMVP candidates starting with index ranging from 0 . . . NumHmvpCand are further used in merge list construction, where initialization is according to a predefined condition. A tile group may comprise one or more tiles, and a tile comprises one or more CTUs. Processing of the CTUs is done per tile, line by line starting from left to right. The general hierarchy is: pictures comprise tile groups and then tile groups comprise tiles. Tiles contain CTUs and each group of CTUs starting from a left column boundary of a tile to a right column boundary of tile constitute one CTU row inside the tile.

In other words, the first CTU of each CTU row inside a tile may be identified by checking whether the address of the given CTU is the same as address of a CTU in a list which stores the address of the left tile column boundary in units of CTBs, which indirectly refers to the first CTU of each CTU row inside a Tile.

In an embodiment, initializing the HMVP list for the current CTU row may comprise the following operations:
resetting the HMVP list for the current CTU row; and/or
setting default values for the HMVP list for the current CTU row; and/or
initializing the HMVP list for the current CTU row based on an HMVP list of a CTU of a previous CTU row in coding and/or scanning order.

Here, the HMVP list may be initialized when the following condition is satisfied:

CtbAddrX==CtbToTileColBd[CtbAddrX]

The list CtbToTileColBd[ctbAddrX] contains the conversion from horizontal CTB address to address of a left tile column boundary in units of CTBs for the "ctbAddrX" ranging from "0 to PicWidthInCtbsY", inclusive. Therefore the equation CtbAddrX==CtbToTileColBd[CtbAddrX]

is satisfied when the horizontal CTB address CtbAddrX is same as the left tile column boundary address which is basically the first CTU of each CTU row inside a Tile. When the above condition is satisfied, then NumHmvpCand is set to 0 (NumHmvpCand=0). This corresponds to re-setting or emptying the HMVP list.

In an embodiment, the previous CTU row in coding and/or scanning order is an immediately preceding CTU row of the current CTU row in the coding and/or scanning order.

In an embodiment, the immediately preceding CTU row of the current CTU row in the coding and/or scanning order is a spatially adjacent or a directly neighboring CTU row of the current CTU row.

In an embodiment, wherein the initializing the HMVP list for the current CTU row is performed at the beginning of a tile group, TG, at the beginning of the tile, or at the beginning of each CTU row of the tile.

Here, three cases may be identified. The HMVP list may be initialized when the following condition is satisfied:

CtbAddrX==CtbToTileColBd[ctbAddrX]

The list CtbToTileColBd[ctbAddrX] contains the conversion from horizontal CTB address to address of a left tile column boundary in units of CTBs for the "ctbAddrX" ranging from "0 to PicWidthInCtbsY", inclusive. Therefore the condition CtbAddrX==CtbToTileColBd[CtbAddrX]

may be satisfied when the horizontal CTB address CtbAddrX is same as the left tile column boundary address which is basically the first CTU of each CTU row inside a Tile. As the HMVP list is reset at the beginning of each line/row, the list is inherently also initialized at the beginning of each tile and tile group, cf. the above comment with respect to processing of tile groups or tiles and CTUs. The condition NumHmvpCand=0 then may reset or empty the HMVP list.

In an embodiment, the initializing the HMVP list for the current CTU row is performed before a first CTU in the current CTU row in coding and/or scanning order is processed, wherein the first CTU in the current CTU row is or comprises:

the first CTU in a tile group, TG, in coding and/or scanning order, and/or the first CTU in a tile in coding and/or scanning order; and/or the first CTU in a CTU row in coding and/or scanning order.

Here the HMVP list may be initialized when the following condition is satisfied:

CtbAddrX==CtbToTileColBd[CtbAddrX]).

The above condition is validated to be true for the beginning of a tile group or a tile or beginning of each CTU row inside a tile. It should be noted the comparison of CtbAddrX==CtbToTileColBd[CtbAddrX] is also true at the beginning of a tile group or a tile. The condition NumHmvpCand=0 then may reset or empty the HMVP list.

In an embodiment, wherein the initializing the HMVP list for the current CTU row comprises resetting the HMVP list for the current CTU row, and wherein the resetting the HMVP list for the current CTU row comprises:

setting a length of the HMVP list to zero for processing the first CTU in the current CTU row in coding or scanning order.

Here, the HMVP list may initialized when the following condition is satisfied:

CtbAddrX==CtbToTileColBd[CtbAddrX]

The above condition is validated to true for the beginning of a tile group or a tile or beginning of each CTU row inside a tile. The condition NumHmvpCand=0 then may reset or empty the HMVP list.

In an embodiment, the initializing the HMVP list for the current CTU row comprises resetting the HMVP list for the current CTU row, wherein resetting the HMVP list for the first CTU in a tile allows to process or code tiles in parallel.

In an embodiment, the initializing the HMVP list for the current CTU row comprises resetting the HMVP list for the current CTU row, wherein resetting the HMVP list for the first CTU of each tile allows to process or code tiles in parallel.

In an embodiment, the initializing the HMVP list for the current CTU row is performed for each CTU row in a tile before the first CTU in the respective CTU row is processed.

In an embodiment, the resetting the HMVP list for the current CTU row further comprises:

incrementing the length of the HMVP list by one when a block of the first CTU is coded using a motion vector, i.e. is inter-coded, and adding the motion vector to the HMVP list.

In an embodiment, the length of the HMVP list is only incremented and the motion vector is only added if motion information is not already contained in the HMVP list.

In an embodiment, the motion information comprises at least one of a motion vector, and a reference picture index.

In an embodiment, the length of the HMVP list is only incremented until a maximum length of the HMVP list is reached.

In an embodiment, the method further comprises:

coding a current block of the current CTU by only considering a reduced number of HMVP list candidates according to a current length of the HMVP list, which is smaller than a maximum length of the HMVP list.

In an embodiment, the reduced number of HMVP list candidates corresponds to or is equal to the current length of the HMVP list.

In an embodiment, the HMVP list is reset for each CTU row in a tile irrespective of a size of the tile.

In an embodiment, the HMVP list is reset for each CTU row in a tile when a size of the tile is greater than or equal to a threshold size, and/or the HMVP list is not reset for each CTU row in a tile when a size of the tile is smaller than the threshold size.

In an embodiment, the setting default values for the HMVP list for the current CTU row comprises:

populating a motion vector, MV, of the HMVP list as a MV of a Uni-prediction manner, wherein the MV of Uni-prediction manner is either a zero motion vector or not a zero motion vector;

wherein reference pictures comprise the first reference picture in list 0, L0, and/or populating a MV of the HMVP list as a MV of Bi-prediction manner, wherein the MV of Bi-prediction manner is either a zero motion vector or not a zero motion vector, wherein the reference pictures comprise a first reference picture in L0 list and a first reference picture in list 1, L1.

In an embodiment, each co-located picture stores a temporal HMVP list for each CTU row or for the whole picture, wherein the setting default values for the HMVP list for the current CTU row comprises:

initializing the HMVP list for the current CTU row based on the temporal HMVP list.

In an embodiment, the previous CTU row is the CTU row immediately adjacent to the current CTU row and on the top of the current CTU row;

wherein the CTU of the previous CTU row either is the second CTU of the previous CTU row, or wherein the CTU of the previous CTU row is the first CTU of the previous CTU row.

In an embodiment, a CTU in a CTU row has a corresponding address, wherein the address of the first CTU in a CTU row is identified by determining the first CTB in a CTU Row in a tile by using the expression FirstCtbInCtuRowInTile=((ctbAddrInTs−FirstCtbAddrTs[tileIdx]−NumCtusInTile[tileIdx])%ColWidth[tileIdx]==0)?1:0, If((tile_group_type !=*I*)&&(FirstCtbInCtuRowInTile))

HMVPCandNum=0 where FirstCtbInCtuRowInTile denotes the first CTU in a CTU row in the tile, ctbAddrInTx denotes an address of a CTB in a tile, FirstCtbAddrTs denotes a first address of a CTB in a tile, tileIdx denotes an index of the respective tile, NumCtusInTile denotes the number of CTUs in a tile, ColWidth denotes the width of the tile in terms of number of CTUs, and "%" is the modulus operator; and tile_groupe_type denotes a type of tile group.

In an embodiment, a CTU in a CTU row has a corresponding address, wherein the address of the first CTU in a CTU row is identified by determining whether the modulus operation of the address j with respect to the current tile yields zero by using the following expression:

if(*j* % ColWidth[tileIdx]==0), where J is the address of the current CTU and ColWidth [tileIdx] indicates the width of the tile in terms of number of CTUs, tileIdx denotes the index of the respective tile, and "%" is the modulus operator.

In an embodiment, a CTU in a CTU row has a corresponding address, wherein the address of the first CTU in each CTU row inside a tile is identified by determining whether the address of the current CTU is the same as the address of a CTU in a list or array storing the address of the left tile column boundary in units of CTBs, such that the first CTU of each CTU row inside a tile is deduced.

In an embodiment, the determining whether the address of the current CTU is the same as the address of a CTU in the list storing the address of the left tile column boundary in units of CTBs uses the expression if(CtbAddrX==CtbToTileColBd[CtbAddrX]

where the list or array CtbToTileColBd[ctbAddrX] includes conversion from a horizontal CTB address to an address of a left tile column boundary in units of CTBs, for "ctbAddrX" ranging from "0 to PicWidthInCtbsY", inclusively, where ctbAddrX indicates the index of the horizontal CTB.

According to another aspect a method is provided coding a picture implemented by an encoding device, comprising:
 initializing a History Based Motion Vector Prediction, HMVP, list for a current Coding Tree Unit, CTU, row within a tile of a picture;
 processing a CTU of the current CTU row based on the initialized HMVP list.

In an embodiment, initializing the HMVP list for the current CTU row comprises the following operations:
 resetting the HMVP list for the current CTU row; and/or
 setting default values for the HMVP list for the current CTU row; and/or
 initializing the HMVP list for the current CTU row based on an HMVP list of a CTU of a previous CTU row in coding and/or scanning order.

In an embodiment, the previous CTU row in coding and/or scanning order is an immediately preceding CTU row of the current CTU row in the coding and/or scanning order.

In an embodiment, the immediately preceding CTU row of the current CTU row in the coding and/or scanning order is a spatially adjacent or a directly neighboring CTU row of the current CTU row.

In an embodiment, the initializing the HMVP list for the current CTU row is performed at the beginning of a tile group, TG, at the beginning of the tile, or at the beginning of each CTU row of the tile.

In an embodiment, the initializing the HMVP list for the current CTU row is performed before a first CTU in the current CTU row in coding and/or scanning order is processed, wherein the first CTU in the current CTU row is or comprises:
 the first CTU in a tile group, TG, in coding and/or scanning order, and/or
 the first CTU in a tile in coding and/or scanning order; and/or
 the first CTU in a CTU row in coding and/or scanning order.

In an embodiment, the initializing the HMVP list for the current CTU row comprises resetting the HMVP list for the current CTU row, and wherein the resetting the HMVP list for the current CTU row comprises:
 setting a length of the HMVP list to zero for processing the first CTU in the current CTU row in coding or scanning order.

In an embodiment, the initializing the HMVP list for the current CTU row comprises resetting the HMVP list for the current CTU row, wherein resetting the HMVP list for the first CTU in a tile allows to process or code tiles in parallel.

In an embodiment, the initializing the HMVP list for the current CTU row comprises resetting the HMVP list for the current CTU row, wherein resetting the HMVP list for the first CTU of each tile allows to process or code tiles in parallel.

In an embodiment, the initializing the HMVP list for the current CTU row is performed for each CTU row in a tile before the first CTU in the respective CTU row is processed.

In an embodiment, the resetting the HMVP list for the current CTU row further comprises:
 incrementing the length of the HMVP list by one when a block of the first CTU is coded using a motion vector, i.e. is inter-coded, and adding the motion vector to the HMVP list.

In an embodiment, the length of the HMVP list is only incremented and the motion vector is only added if motion information is not already contained in the HMVP list.

In an embodiment, the motion information comprises at least one of a motion vector, and a reference picture index.

In an embodiment, the length of the HMVP list is only incremented until a maximum length of the HMVP list is reached.

In an embodiment, the method further comprises:
 coding a current block of the current CTU by only considering a reduced number of HMVP list candidates according to a current length of the HMVP list, which is smaller than a maximum length of the HMVP list.

In an embodiment, the reduced number of HMVP list candidates corresponds to or is equal to the current length of the HMVP list.

In an embodiment, the HMVP list is reset for each CTU row in a tile irrespective of a size of the tile.

In an embodiment, the HMVP list is reset for each CTU row in a tile when a size of the tile is greater than or equal to a threshold size, and/or wherein the HMVP list is not reset for each CTU row in a tile when a size of the tile is smaller than the threshold size.

In an embodiment, the setting default values for the HMVP list for the current CTU row comprises:

populating a motion vector, MV, of the HMVP list as a MV of a Uni-prediction manner, wherein the MV of Uni-prediction manner is either a zero motion vector or not a zero motion vector;

wherein reference pictures comprise the first reference picture in list 0, L0, and/or populating a MV of the HMVP list as a MV of Bi-prediction manner, wherein the MV of Bi-prediction manner is either a zero motion vector or not a zero motion vector, wherein the reference pictures comprise a first reference picture in L0 list and a first reference picture in list 1, L1.

In an embodiment, each co-located picture stores a temporal HMVP list for each CTU row or for the whole picture, wherein the setting default values for the HMVP list for the current CTU row comprises:

initializing the HMVP list for the current CTU row based on the temporal HMVP list.

In an embodiment, the previous CTU row is the CTU row immediately adjacent to the current CTU row and on the top of the current CTU row;

wherein the CTU of the previous CTU row either is the second CTU of the previous CTU row, or wherein the CTU of the previous CTU row is the first CTU of the previous CTU row.

In an embodiment, a CTU in a CTU row has a corresponding address, wherein the address of the first CTU in a CTU row is identified by determining whether the modulus operation of the address j with respect to the current tile yields zero by using the following expression:

if(j % ColWidth[tileIdx]==0), where J is the address of the current CTU and ColWidth[tileIdx] indicates the width of the tile in terms of number of CTUs, tileIdx denotes the index of the respective tile, and "%" is the modulus operator.

In an embodiment, a CTU in a CTU row has a corresponding address, wherein the address of the first CTU in each CTU row inside a tile is identified by determining whether the address of the current CTU is the same as the address of a CTU in a list or array storing the address of the left tile column boundary in units of CTBs, such that the first CTU of each CTU row inside a tile is deduced.

In an embodiment, the determining whether the address of the current CTU is the same as the address of a CTU in the list storing the address of the left tile column boundary in units of CTBs uses the expression if(CtbAddrX==CtbToTileColBd[CtbAddrX]), where the list or array CtbToTileColBd[ctbAddrX] includes conversion from a horizontal CTB address to an address of a left tile column boundary in units of CTBs, for "ctbAddrX" ranging from "0 to PicWidthInCtbsY", inclusively, where ctbAddrX indicates the index of the horizontal CTB.

According to another aspect a decoder is provided, the decoder comprising processing circuitry for carrying out the above method according to any preceding implementation of any preceding aspect or any preceding aspect as such.

According to another aspect an encoder is provided, the encoder comprising processing circuitry for carrying out the method according to any preceding implementation of the previous aspect or the previous aspect as such.

According to another aspect a computer program product is provided, the computer program product comprising a program code for performing the method according to any preceding implementation of the previous aspect or the previous aspect as such.

According to another aspect a computer-readable non-transitory medium is provided, the computer-readable non-transitory medium storing a program, including instructions which when executed on a processor cause the processor to perform the method according to any preceding implementation of the previous aspect or the previous aspect as such.

According to another aspect a decoder is provided, comprising:

one or more processors; and a non-transitory computer-readable storage medium coupled to the processors and storing programming for execution by the processors, wherein the programming, when executed by the processors, configures the decoder to carry out In an embodiment.

According to another aspect an encoder is provided, comprising:

one or more processors; and a non-transitory computer-readable storage medium coupled to the processors and storing programming for execution by the processors, wherein the programming, when executed by the processors, configures the encoder to carry out any preceding implementation of the previous aspect or the previous aspect as such.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which:

FIG. 8 shows an example syntax specification for an HMVP list reset for tile groups, tiles and CTU rows inside of tiles;

FIG. 12 shows examples of updating an HMVP table;

FIG. 14 shows an alternative example syntax specification for an HMVP list reset for tile groups, tiles and CTU rows inside of tiles;

FIG. 15 shows an example of a data structure containing a bin string of merge index;

Figure 1A:
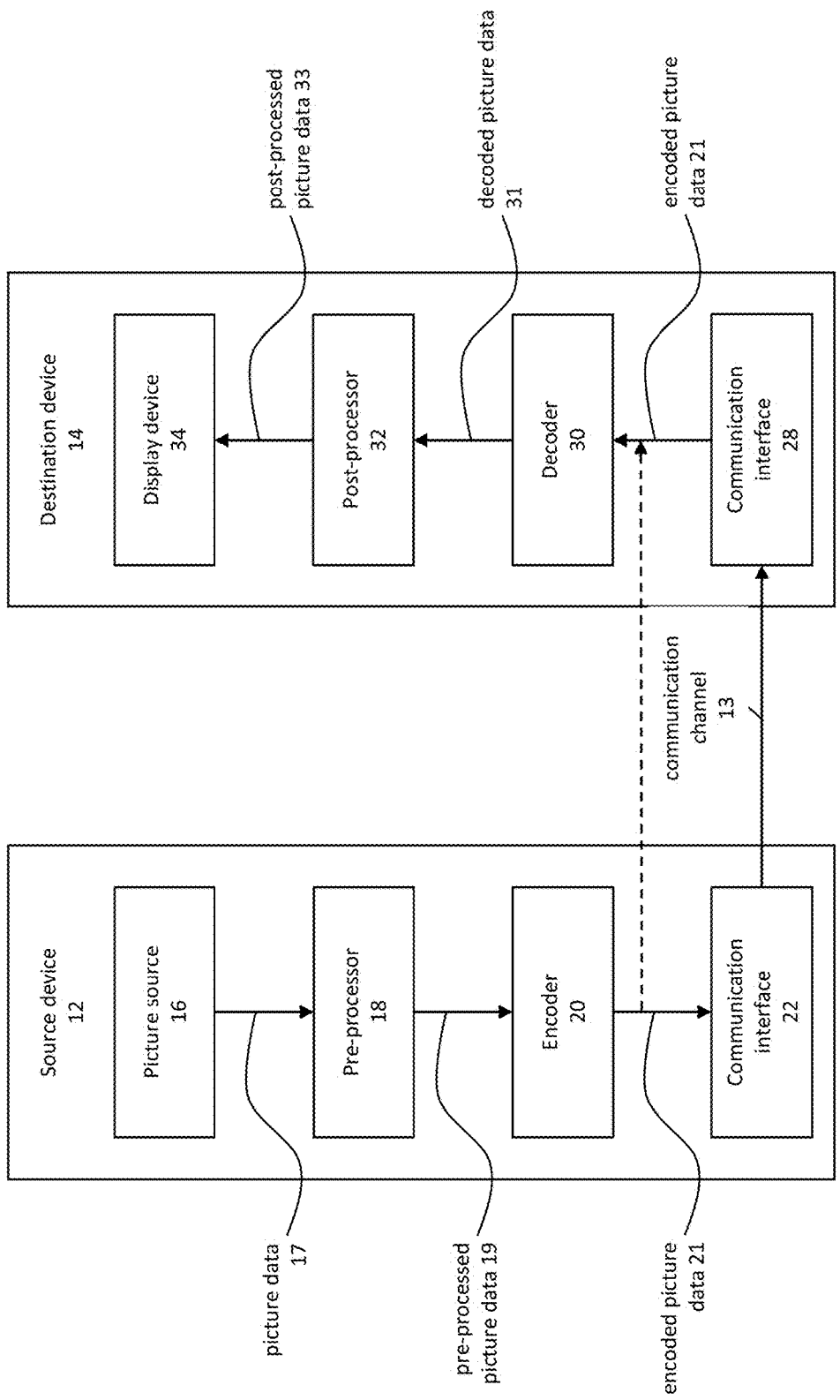
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2). Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
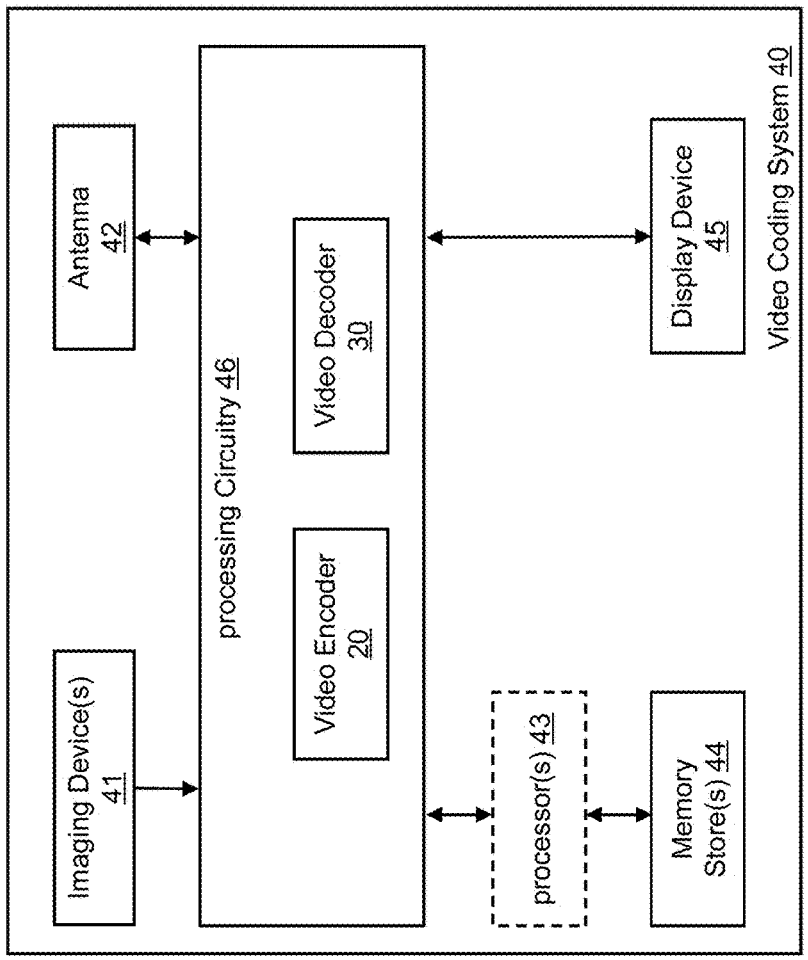
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
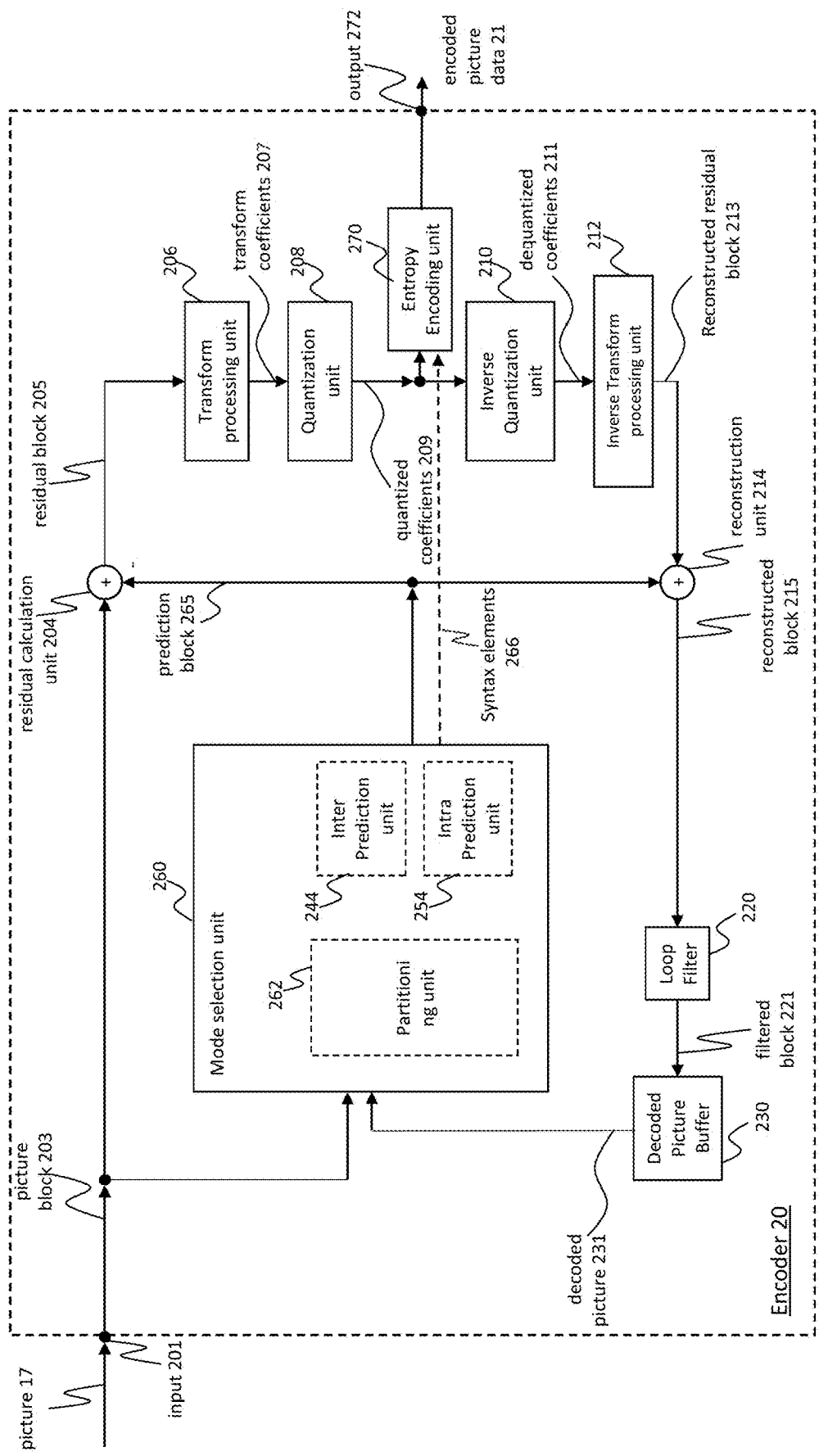
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
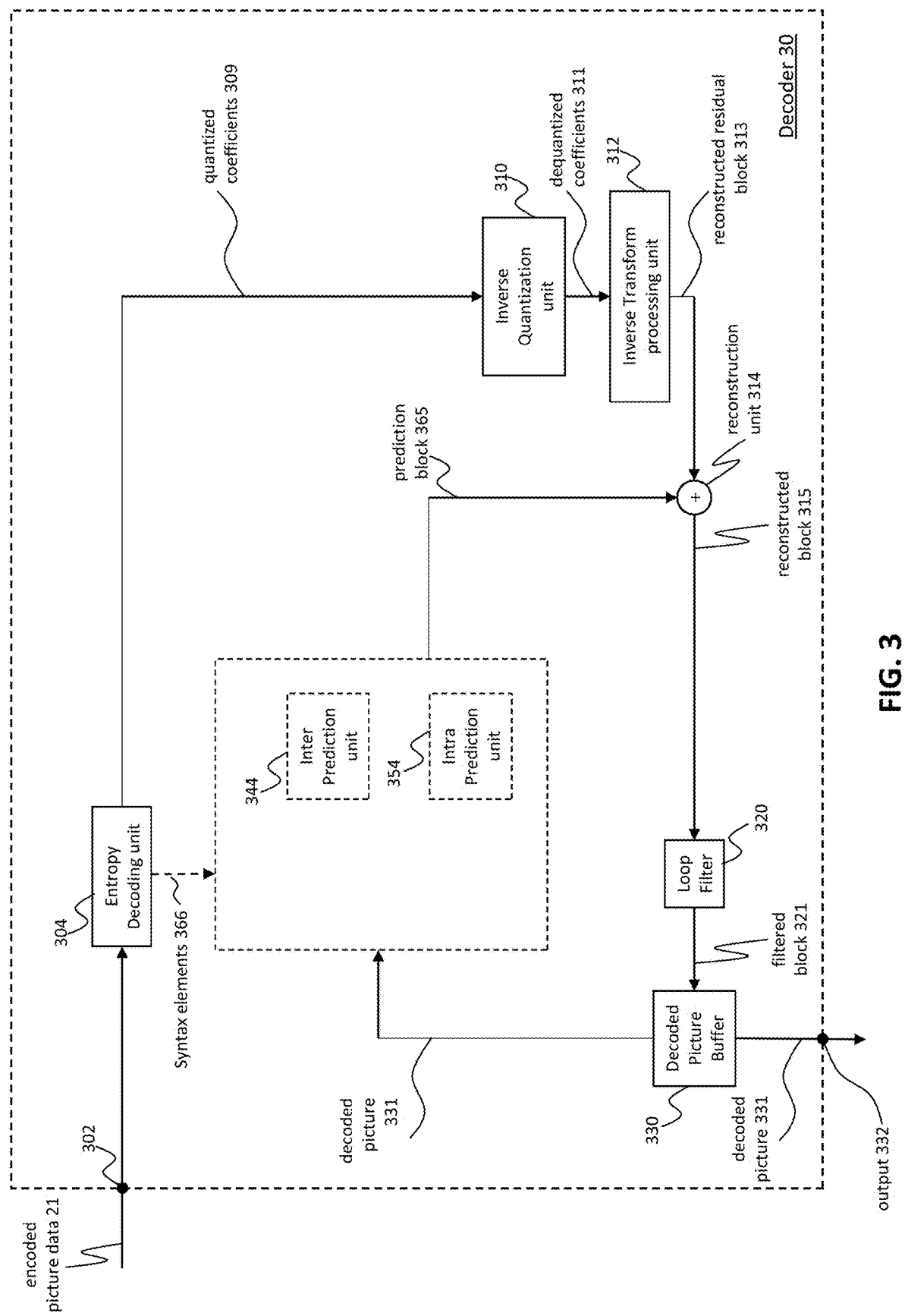
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g. the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond —although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate color planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning may be used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice. In addition or as an alternative to video slices and respective syntax elements, tiles and tile groups and respective syntax may be used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tiles or tile groups) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214, the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level. In addition or as an alternative to video slices and respective syntax elements, tiles and tile groups and respective syntax may be used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tiles (video tiles) or tile groups (video tile groups) in addition or alternatively to slices (video slices).

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tiles (video tiles) or tile groups (video tile groups) in addition or alternatively to slices (video slices).

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(\text{bitDepth}-1) \sim 2^{\wedge}(\text{bitDepth}-1)-1$, where "^" means exponentiation. For example, if bitDepth is set equal to 16, the range is $-32768$-$32767$; if bitDepth is set equal to 18, the range is $-131072$-$131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux = (mvx + 2^{bitDepth}) \% 2^{bitDepth} \tag{1}$$

$$mvx = (ux >= 2^{bitDepth-1}) ? (ux - 2^{bitDepth}) : ux \tag{2}$$

$$uy = (mvy + 2^{bitDepth}) \% 2^{bitDepth} \tag{3}$$

$$mvy = (uy >= 2^{bitDepth-1}) ? (uy - 2^{bitDepth}) : uy \tag{4}$$

where mvx is a horizontal component of a motion vector of an image block or a sub-block, mvy is a vertical component of a motion vector of an image block or a sub-block, and ux and uy indicates an intermediate value;

For example, if the value of mvx is $-32769$, after applying formula (1) and (2), the resulting value is 32767. In computer system, decimal numbers are stored as two's complement. The two's complement of $-32769$ is 1,0111,1111,1111,1111 (17 bits), then the MSB is discarded, so the resulting two's complement is 0111,1111,1111,1111 (decimal number is 32767), which is same as the output by applying formula (1) and (2).

$$ux = (mvpx + mvdx + 2^{bitDepth}) \% 2^{bitDepth} \tag{5}$$

$$mvx = (ux >= 2^{bitDepth-1}) ? (ux - 2^{bitDepth}) : ux \tag{6}$$

$$uy = (mvpy + mvdy + 2^{bitDepth}) \% 2^{bitDepth} \tag{7}$$

$$mvy = uy >= 2^{bitDepth-1} ? (uy - 2^{bitDepth}) : uy \tag{8}$$

The operations may be applied during the sum of mvp and mvd, as shown in formula (5) to (8).

Method 2: remove the overflow MSB by clipping the value $$vx = \text{Clip3}(-2^{bitDepth-1}, 2^{bitDepth-1}-1, vx)$$

$$vy = \text{Clip3}(-2^{bitDepth-1}, 2^{bitDepth-1}-1, vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x, y, z) = \begin{cases} x & ; \quad z < x \\ y & ; \quad z > y \\ z & ; \quad \text{otherwise} \end{cases}$$

Figure 4:
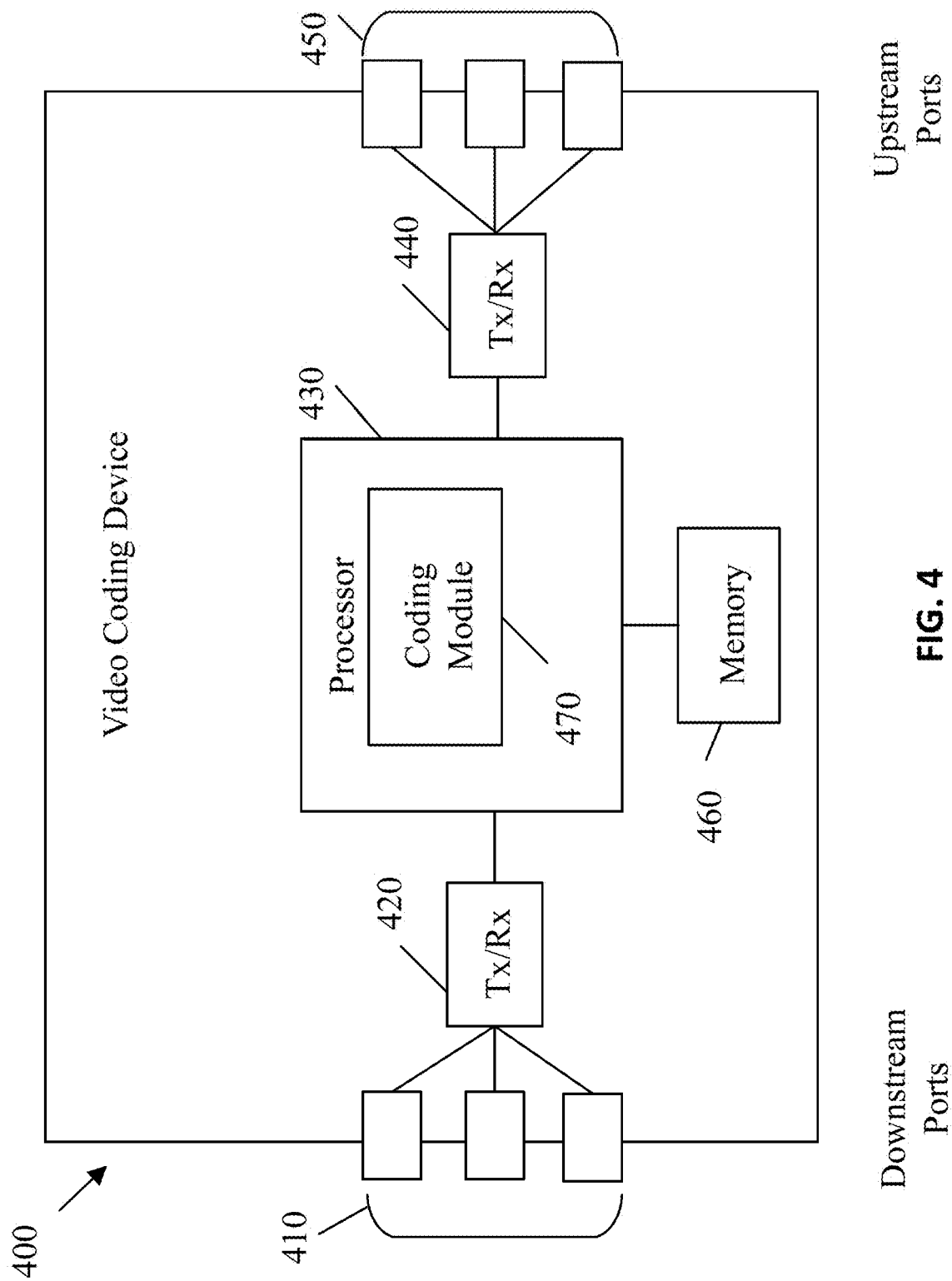
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
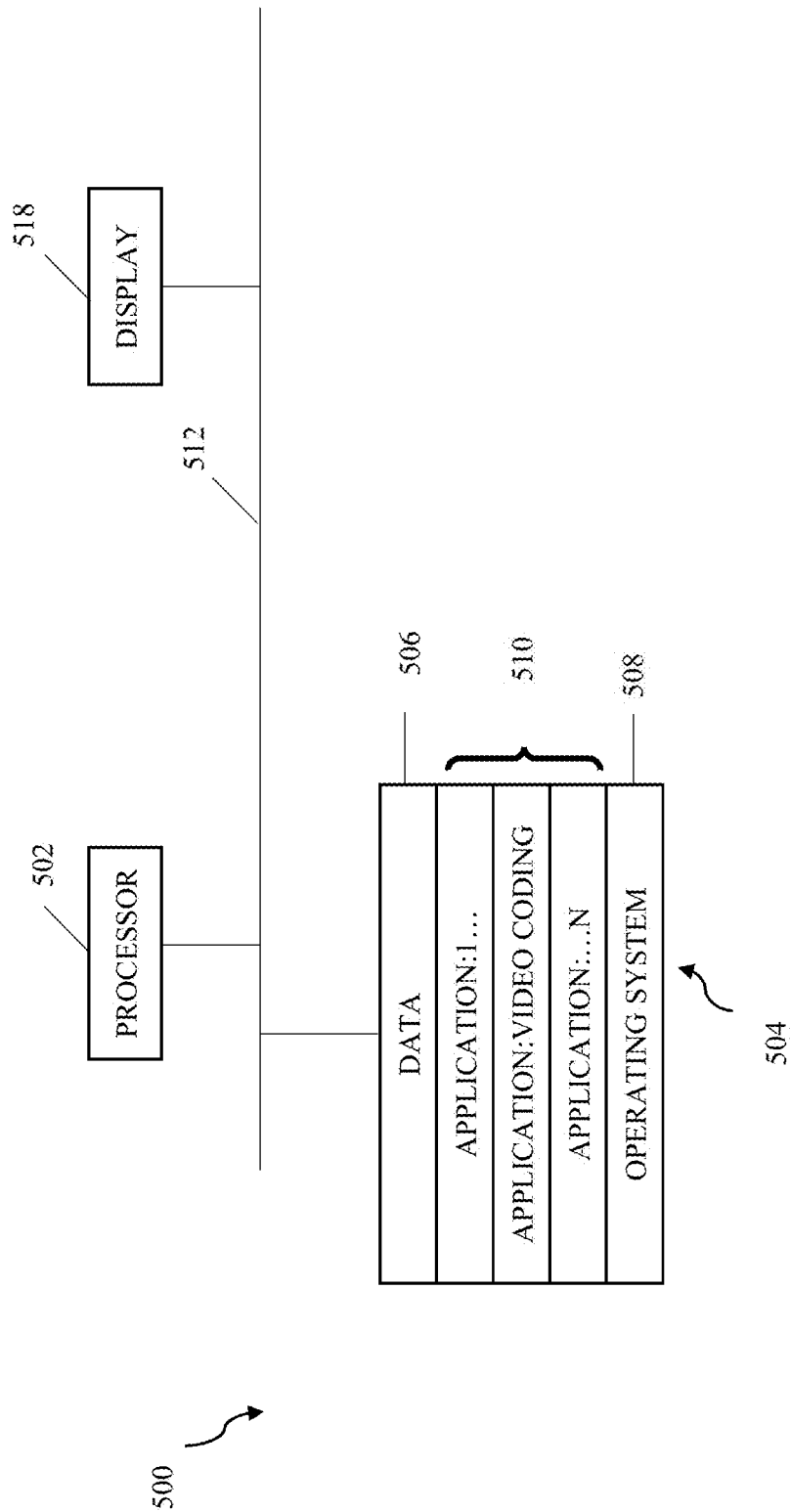
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.
x/y Used to denote division in mathematical equations where no truncation or rounding is intended.

$$\sum_{i=x}^{y} f(i)$$

The summation of f(i) with i taking all integer values from x up to and including y.
Modulus. Remainder of x divided by y, defined only for integers x and y with x % y x>=0 and y>0.

Logical Operators

The following logical operators are defined as follows:
x && y Boolean logical "and" of x and y
x||y Boolean logical "or" of x and y
! Boolean logical "not"
x ? y: z If x is TRUE or not equal to 0, evaluates to the value of y; otherwise, evaluates to the value of z.

Relational Operators

The following relational operators are defined as follows:

\> Greater than

\>= Greater than or equal to

< Less than

<= Less than or equal to

== Equal to

!= Not equal to

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

-- Decrement, i.e., x-- is equivalent to x=x-1; when used in an array index, evaluates to the value of the variable prior to the decrement operation.

+= Increment by amount specified, i.e., x+=3 is equivalent to x=x+3, and x+=(-3) is equivalent to x=x+(-3).

-= Decrement by amount specified, i.e., x-=3 is equivalent to x=x-3, and x-=(-3) is equivalent to x=x-(-3).

Range Notation

The following notation is used to specify a range of values:

x=y . . . z x takes on integer values starting from y to z, inclusive, with x, y, and z being integer numbers and z being greater than y.

Order of Operation Precedence

When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
|---|
| operations (with operands x, y, and z) |
| "x++", "x--" |
| "!x", "-x" (as a unary prefix operator) |
| $x^y$ |
| "x * y", "x / y", "x ÷ y", "x/y", "x % y" |
| "x + y", "x − y" (as a two-argument operator), $"\sum_{i=x}^{y} f(i)"$ |
| "x << y", "x >> y" |
| "x < y", "x <= y", "x > y", "x >= y" |
| "x == y", "x != y" |
| "x & y" |
| "x \| y" |
| "x && y" |
| "x \|\| y" |
| "x ? y : z" |
| "x..y" |
| "x = y", "x += y", "x -= y" |

Text Description of Logical Operations

In the text, a statement of logical operations as would be described mathematically in the following form:

```
if( condition 0)
    statement 0
else if( condition 1)
    statement 1
...
else /* informative remark on remaining condition */
    statement n
``` may be described in the following manner:

. . . as follows/ . . . the following applies:

If condition 0, statement 0

Otherwise, if condition 1, statement 1

. . .

Otherwise (informative remark on remaining condition), statement n

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a | | condition 1b )
    statement 1
...
else
    statement n
``` may be described in the following manner:
. . . as follows/ . . . the following applies:
    If all of the following conditions are true, statement 0:
        condition 0a
        condition 0b
    Otherwise, if one or more of the following conditions are true, statement 1:
        condition 1a
        condition 1b
    . . .
    Otherwise, statement n In the text, a statement of logical operations as would be described mathematically in the following form:

```
if(condition 0)
    statement 0
if(condition 1)
    statement 1
``` may be described in the following manner:
    When condition 0, statement 0
    When condition 1, statement 1

Tiles Groups and Tiles

Embodiments of the application may be configured to implement the concept of tiles and tile groups, or in other words to process or code pictures using tiles and tile groups as described in more detail below.

tile: A rectangular region of CTUs within a particular tile column and a particular tile row in a picture. Tiles may vary in size between pictures and within the same picture.

tile column: A rectangular region of CTUs having a height equal to the height of the picture and a specified width, e.g. specified by syntax elements in the picture parameter set.

tile group: An integer number of tiles of a picture in tile raster scan of the picture, the tiles of the tile group may be exclusively contained in a single NAL unit.

tile group header: A part of a coded tile group containing the data elements pertaining to the first or all tiles represented in the tile group.

tile group data: contains the actual coded data of all the tiles belonging to a given tile group tile row: A rectangular region of CTUs having a specified height, e.g. specified by syntax elements in the picture parameter set, and a width equal to the width of the picture.

tile scan: A specific sequential ordering of CTUs partitioning a picture in which the CTUs are ordered consecutively in CTU raster scan in a tile whereas tiles in a picture are ordered consecutively in a raster scan of the tiles of the picture.

raster scan: A mapping of a rectangular two-dimensional pattern to a one-dimensional pattern such that the first entries in the one-dimensional pattern are from the first top row of the two-dimensional pattern scanned from left to right, followed similarly by the second, third, etc., rows of the pattern (going down) each scanned from left to right.

For further terms and definitions, if not already specified herein, it is referenced to JVET-L1001-v10 from 14-12-2018 and JVET-L0686-V2 from 12-10-2018, which are herein incorporated by reference in complete and in particular the parts (also referred to as clauses) of JVET-L1001-v10 specifically cited herein.

Figure 6:
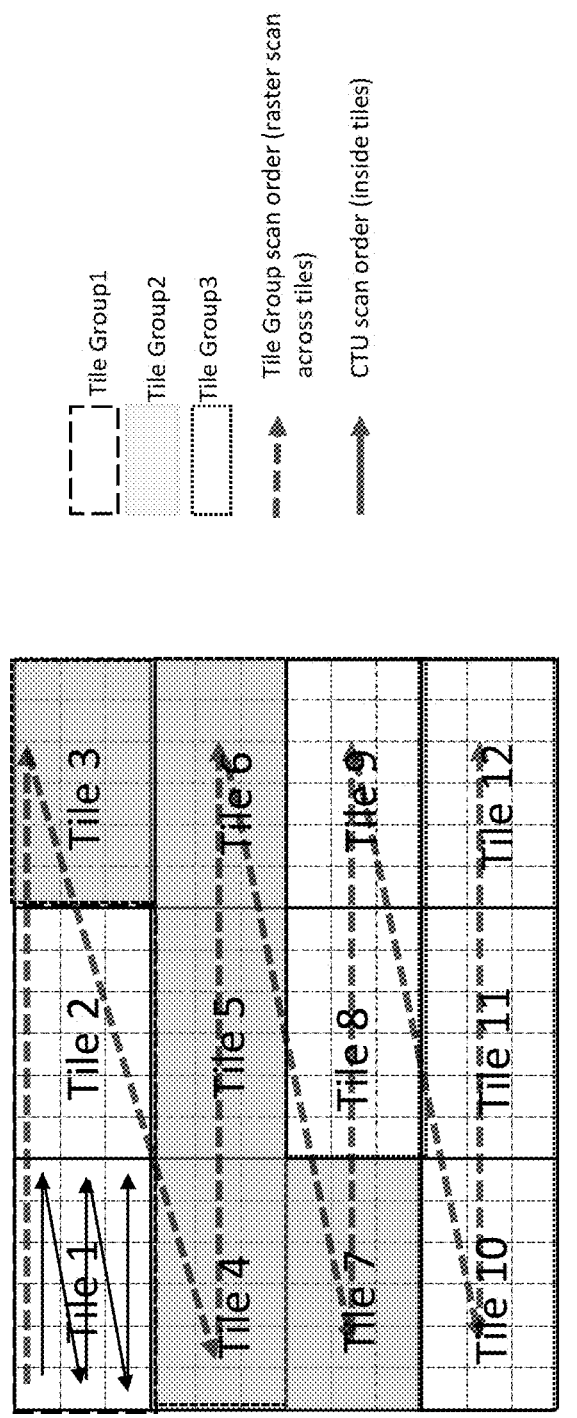
FIG. 6 shows an example of a picture comprising or being divided into 12 tiles, which are assigned to 3 tile groups.

Partitioning of Pictures into Tile Groups and Tiles:

As exemplarily shown in FIG. 6, a picture can be divided into tile groups and tiles. A tile group is a sequence of tiles, e.g. in tile raster scan of a picture. A tile is a sequence of CTUs that cover a rectangular region of a picture. In FIG. 6 the picture is divided into 12 tiles (tiles 1 to 12) and 3 tile groups (tile Groups 1 to 3). In FIG. 6 the picture comprises 3 tile columns and 4 tile rows, and tiles 1 and 2 belong to tile group 1, tiles 3 to 7 belong to tile group 2, and tiles 8 to 12 belong to tile group 3. Each of the tiles depicted in FIG. 6 comprises 18 CTUs, arranged in 6 CTU columns and 3 CTU rows. The raster scan across tiles (tile scan order within a picture) may be a raster scan, e.g., a scan starting with tile 1 as top left tile and scanning the picture horizontally tile row by tile row, and ending with tile 12 as bottom right tile. A dashed arrow indicating the tile group scan order, i.e. the raster scan across the tiles, indicates this. Within the tiles another raster scan (raster scan within a tile) can be performed (CTU scan order within a tile), e.g., a scan starting with the top left CTU and scanning the tile horizontally CTU row by CTU row, and ending with the bottom right CTU. This raster scan within the tile is indicated by the solid arrow indicated the CTU scan order within the tile.

Thus, as shown in FIG. 6, tile groups shown consist of tiles, and tiles comprise an integer number of CTUs. For FIG. 6, it should further be noted that the Versatile Test Model, VTM, version 3.1 also uses tile groups.

Figure 7:
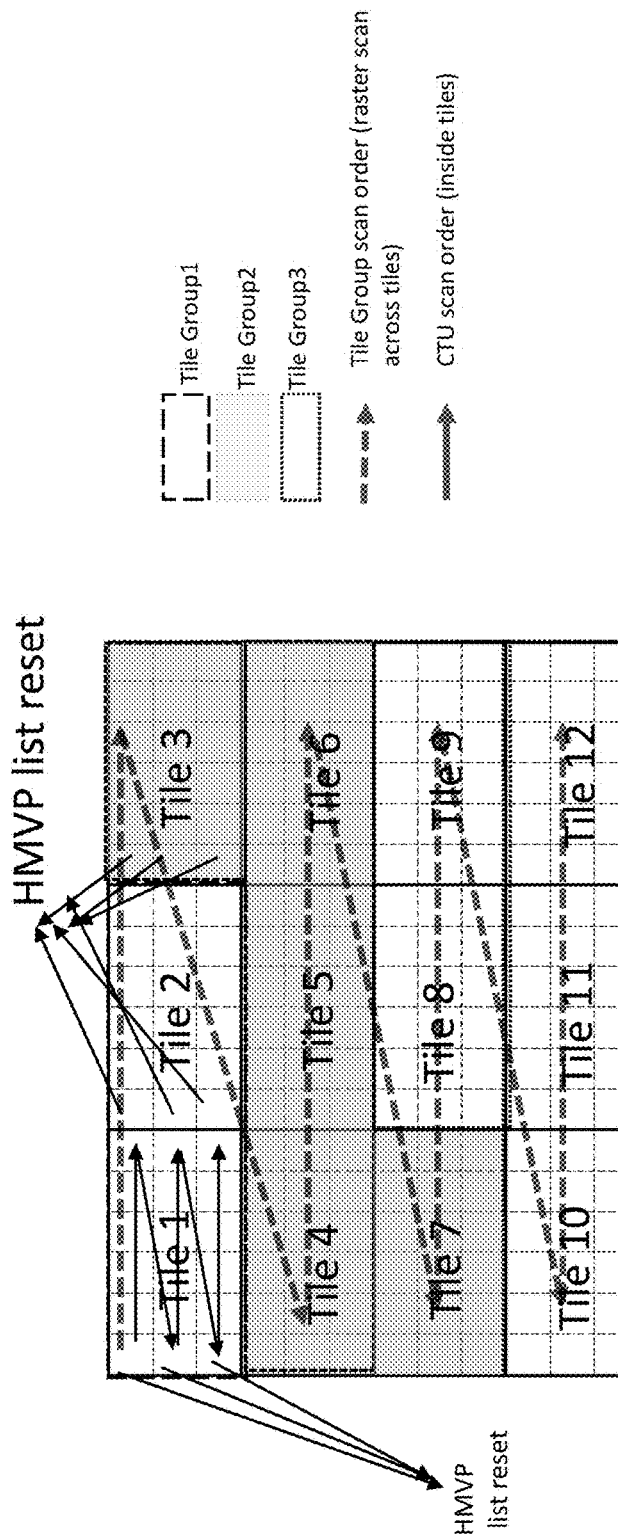
FIG. 7 shows a reset for tile groups, tiles and CTU rows inside of tiles for the example of FIG. 6.

FIGS. 6 and 7 show tile groups, TGs, with respect to a raster scan order. This may be compared to FIG. 9, which shows a rectangular TG. Tile groups may also be considered as slices comprising tiles.

CTB Raster and Tile Scanning Process

The list ColWidth[i] for i ranging from 0 to numtile_columns_minus1, inclusive, specifying the width of the i-th tile column in units of CTBs, is derived as follows:

```
if( uniform_tile_spacing_flag)
    for( i = 0; i <= num_tile_columns_minus1; i++ )
        ColWidth[ i ] = ( ( i + 1) * PicWidthInCtbsY ) /
        ( num_tile_columns_minus1 + 1) –
            ( i * PicWidthInCtbsY ) / ( num_tile_columns_minus1 + 1 )
else {
    ColWidth[ num_tile_columns_minus1 ] = PicWidthInCtbsY         (1)
    for( i = 0; i < num_tile_columns_minus1; i++ ) {
        ColWidth[ i ] = tile_column_width_minus1[ i ] + 1
        ColWidth[ num_tile_columns_minus1 ] –= ColWidth[ i ]
    }
}
```

The list RowHeight[j] for j ranging from 0 to num_tile_rows_minus1, inclusive, specifying the height of the j-th tile row in units of CTBs, is derived as follows:

```
if( uniform_tile_spacing_flag)
    for( j = 0; j <= num_tile_rows_minus1; j++ )
        RowHeight[ j ] = ( ( j + 1) * PicHeightInCtbsY ) /
        ( num_tile_rows_minus1 + 1 ) –
            ( j * PicHeightInCtbsY ) / ( num_tile_rows_minus1 + 1)
else {
    RowHeight[ num_tile_rows_minus1 ] = PicHeightInCtbsY         (2)
    for( j = 0; j < num_tile_rows_minus1; j++ ) {
        RowHeight[ j ] = tile_row_height_minus1[ j ] + 1
        RowHeight[ num_tile_rows_minus1 ] –= RowHeight[ j ]
    }
}
```

The list ColBd[i] for i ranging from 0 to num_tile_columns_minus1+1, inclusive, specifying the location of the i-th tile column boundary in units of CTBs, is derived as follows:

$$\text{for}(\text{ColBd}[0]=0, i=0; i<=\text{num\_tile\_columns\_minus1}; i++) \text{ColBd}[i+1]=\text{ColBd}[i]+\text{ColWidth}[i] \quad (3)$$

The list RowBd[j] for j ranging from 0 to num_tile_rows_minus1+1, inclusive, specifying the location of the j-th tile row boundary in units of CTBs, is derived as follows:

$$\text{for}(\text{RowBd}[0]=0, j=0; j<=\text{num\_tile\_rows\_minus1}; j++) \text{RowBd}[j+1]=\text{RowBd}[j]+\text{RowHeight}[j] \quad (4)$$

The list CtbAddrRsToTs[ctbAddrRs] for ctbAddrRs ranging from 0 to PicSizeInCtbsY−1, inclusive, specifying the conversion from a CTB address in CTB raster scan of a picture to a CTB address in tile scan, is derived as follows:

```
for( ctbAddrRs = 0; ctbAddrRs < PicSizeInCtbsY; ctbAddrRs++ ) {
  tbX = ctbAddrRs % PicWidthInCtbsY
  tbY = ctbAddrRs / PicWidthInCtbsY
  for( i = 0; i <= num_tile_columns_minus1; i++ )
    if( tbX >= ColBd[ i ] )
      tileX = i
  for( j = 0; j <= num_tile_rows_minus1 ; j++ )         (5)
    if( tbY >= RowBd[ j ] )
      tileY = j
  CtbAddrRsToTs[ ctbAddrRs ] = 0
  for( i = 0; i < tileX; i++ )
    CtbAddrRsToTs[ ctbAddrRs ] += RowHeight[ tileY ] * ColWidth[ i ]
  for( j = 0; j < tileY; j++ )
    CtbAddrRsToTs[ ctbAddrRs ] += PicWidthInCtbsY * RowHeight[ j ]
  CtbAddrRsToTs[ ctbAddrRs ] += ( tbY − RowBd[ tileY ]
) * ColWidth[ tileX ] + tbX − ColBd[ tileX ]
}
```

The list CtbAddrTsToRs[ctbAddrTs] for ctbAddrTs ranging from 0 to PicSizeInCtbsY−1, inclusive, specifying the conversion from a CTB address in tile scan to a CTB address in CTB raster scan of a picture, is derived as follows:

$$\text{for}(\text{ctbAddrRs}=0; \text{ctbAddrRs}<\text{PicSizeInCtbsY}; \text{ctbAddrRs}++)$$

$$\text{CtbAddrTsToRs}[\text{CtbAddrRsToTs}[\text{ctbAddrRs}]]=\text{ctbAddrRs} \quad (6)$$

The list TileId[ctbAddrTs] for ctbAddrTs ranging from 0 to PicSizeInCtbsY−1, inclusive, specifying the conversion from a CTB address in tile scan to a tile ID, is derived as follows:

$$\text{for}(j=0, \text{tileIdx}=0; j<=\text{num\_tile\_rows\_minus1}; j++)$$

$$\text{for}(i=0; i<=\text{num\_tile\_columns\_minus1}; i++, \text{tileIdx}++)$$

$$\text{for}(y=\text{RowBd}[j]; y<\text{RowBd}[j+1]; y++)$$

$$\text{for}(x=\text{ColBd}[i]; x<\text{ColBd}[i+1]; x++)$$

$$\text{TileId}[\text{CtbAddrRsToTs}[y*\text{PicWidthInCtbsY}+x]]=\text{tileIdx} \quad (7)$$

The list NumCtusInTile[tileIdx] for tileIdx ranging from 0 to PicSizeInCtbsY−1, inclusive, specifying the conversion from a tile index to the number of CTUs in the tile, is derived as follows:

$$\text{for}(j=0, \text{tileIdx}=0; j<=\text{num\_tile\_rows\_minus1}; j++)$$

$$\text{for}(i=0; i<=\text{num\_tile\_columns\_minus1}; i++, \text{tileIdx}++)$$

$$\text{NumCtusInTile}[\text{tileIdx}]=\text{ColWidth}[i]*\text{RowHeight}[j] \quad (8)$$

The list FirstCtbAddrTs[tileIdx] for tileIdx ranging from 0 to NumTilesInPic−1, inclusive, specifying the conversion from a tile ID to the CTB address in tile scan of the first CTB in the tile are derived as follows:

```
for( ctbAddrTs = 0, tileIdx = 0, tileStartFlag = 1;
ctbAddrTs < PicSizeInCtbsY;
ctbAddrTs++ ) {
  if( tileStartFlag ) {
    FirstCtbAddrTs[ tileIdx ] = ctbAddrTs         (9)
    tileStartFlag = 0
  }
  tileEndFlag = ctbAddrTs = = PicSizeInCtbsY − 1 | |
  TileId[ ctbAddrTs + 1 ]
  != TileId[ ctbAddrTs ]
  if( tileEndFlag ) {
    tileIdx++
    tileStartFlag = 1
  }
}
```

The values of ColumnWidthInLumaSamples[i], specifying the width of the i-th tile column in units of luma samples, are set equal to ColWidth[i]<<CtbLog 2SizeY for i ranging from 0 to num_tile_columns_minus1, inclusive.

The values of RowHeightInLumaSamples[j], specifying the height of the j-th tile row in units of luma samples, are set equal to RowHeight[j]<<CtbLog 2SizeY for j ranging from 0 to num_tile_rows_minus1, inclusive Picture Parameter Set RBSP (Raw Byte Sequence Payload) Syntax The picture parameter set syntax with tiles and tile groups is as shown below.

| pic_parameter_set_rbsp( ) { | Descriptor |
|---|---|
| pps_pic_parameter_set_id | ue(v) |
| pps_seq_parameter_set_id | ue(v) |
| transform_skip_enabled_flag | u(1) |
| single_tile_in_pic_flag | u(1) |
| if( !single_tile_in_pic_flag ) { | |
| num_tile_columns_minus1 | ue(v) |
| num_tile_rows_minus1 | ue(v) |
| uniform_tile_spacing_flag | u(1) |
| if( !uniform_tile_spacing_flag ) { | |
| for( i = 0; i < num_tile_columns_minus1; i++ ) | |
| tile_column_width_minus1[ i ] | ue(v) |
| for( i = 0; i < num_tile_rows_minus1; i++ ) | |
| tile_row_height_minus1[ i ] | ue(v) |
| } | |
| loop_filter_across_tiles_enabled_flag | u(1) |
| } | |
| rbsp_trailing_bits( ) | |
| } | |

Tile Group Header Syntax

| tile_group_header( ) { | Descriptor |
|---|---|
| tile_group_pic_parameter_set_id | ue(v) |
| if( NumTilesInPic > 1 ) { | |
| tile_group_address | u(v) |
| num_tiles_in_tile_group_minus1 | ue(v) |
| } | |
| tile_group_type | ue(v) |
| if ( tile_group_type != I ) { | |
| log2_diff_ctu_max_bt_size | ue(v) |
| if( sps_sbtmvp_enabled_flag ) { | |
| sbtmvp_size_override_flag | u(1) |
| if( sbtmvp_size_override_flag ) | |
| log2_sbtmvp_active_size_minus2 | u(3) |
| } | |

-continued

```
tile_group_header( ) {                                              Descriptor
    if( sps_temporal_mvp_enabled_flag )
        tile_group_temporal_mvp_enabled_flag                        u(1)
    if( tile_group_type = = B )
        mvd_l1_zero_flag                                            u(1)
    if( tile_group_temporal_mvp_enabled_flag ) {
        if( tile_group_type = = B )
            collocated_from_l0_flag                                 u(1)
    }
    six_minus_max_num_merge_cand                                    ue(v)
}
dep_quant_enabled_flag                                              u(1)
if( !dep_quant_enabled_flag )
    sign_data_hiding_enabled_flag                                   u(1)
if( num_tiles_in_tile_group_minus1 > 0 ) {
    offset_len_minus1                                               ue(v)
    for( i = 0; i < num_tiles_in_tile_group_minus1; i++ )
        entry_point_offset_minus1[ i ]                              u(v)
}
byte_alignment( )
}
```

Tile Group Data Syntax

```
tile_group_data( ) {                                                Descriptor
    tileIdx = tile_group_address
    for( i = 0; i <= num_tiles_in_tile_group_minus1;
        i++, tileIdx++ ) {
        ctbAddrInTs = FirstCtbAddrTs[ tileIdx ]
        for( j = 0; j < NumCtusInTile[ tileIdx ]; j++,
            ctbAddrInTs++ ) {
            CtbAddrInRs = CtbAddrTsToRs[ ctbAddrInTs ]
            coding_tree_unit( )
        }
        end_of_tile_one_bit /* equal to 1 */                        ae(v)
        if( i < num_tiles_in_tile_group_minus1 )
            byte_alignment( )
    }
}
```

Picture Parameter Set Symantics single_tile_in_pic_flag equal to 1 specifies that there is only one tile in each picture referring to the PPS. single_tile_in_pic_flag equal to 0 specifies that there is more than one tile in each picture referring to the PPS.

It is a requirement of bitstream conformance that the value of single_tile_in_pic_flag shall be the same for all PPSs that are activated within a CVS.

num_tile_columns_minus1 plus 1 specifies the number of tile columns partitioning the picture. num_tile_columns_minus1 shall be in the range of 0 to PicWidthInCtbsY−1, inclusive. When not present, the value of num_tile_columns_minus1 is inferred to be equal to 0.

num_tile_rows_minus1 plus 1 specifies the number of tile rows partitioning the picture. num_tile_rows_minus1 shall be in the range of 0 to PicHeightInCtbsY−1, inclusive. When not present, the value of num_tile_rows_minus1 is inferred to be equal to 0.

The variable NumTilesInPic is set equal to (num_tile_columns_minus1+1)*(num_tile_rows_minus1+1). When single_tile_in_pic_flag is equal to 0, NumTilesInPic shall be greater than 1.

uniform_tile_spacing_flag equal to 1 specifies that tile column boundaries and likewise tile row boundaries are distributed uniformly across the picture. uniform_tile_spacing_flag equal to 0 specifies that tile column boundaries and likewise tile row boundaries are not distributed uniformly across the picture but signalled explicitly using the syntax elements tile_column_width_minus1[i] and tile_row_height_minus1[i]. When not present, the value of uniform_tile_spacing_flag is inferred to be equal to 1.

tile_column_width_minus1[i] plus 1 specifies the width of the i-th tile column in units of CTBs.

tile_row_height_minus1[i] plus 1 specifies the height of the i-th tile row in units of CTBs.

The following variables are derived by invoking the CTB raster and tile scanning conversion process as specified in the section "CTB raster and tile scanning process":

The list ColWidth[i] for i ranging from 0 to num_tile_columns_minus1, inclusive, specifying the width of the i-th tile column in units of CTBs, the list RowHeight[j] for j ranging from 0 to num_tile_rows_minus1, inclusive, specifying the height of the j-th tile row in units of CTBs, the list ColBd[i] for i ranging from 0 to num_tile_columns_minus1+1, inclusive, specifying the location of the i-th tile column boundary in units of CTBs, the list RowBd[j] for j ranging from 0 to num_tile_rows_minus1+1, inclusive, specifying the location of the j-th tile row boundary in units of CTBs, the list CtbAddrRsToTs[ctbAddrRs] for ctbAddrRs ranging from 0 to PicSizeInCtbsY−1, inclusive, specifying the conversion from a CTB address in the CTB raster scan of a picture to a CTB address in the tile scan, the list CtbAddrTsToRs[ctbAddrTs] for ctbAddrTs ranging from 0 to PicSizeInCtbsY−1, inclusive, specifying the conversion from a CTB address in the tile scan to a CTB address in the CTB raster scan of a picture, the list TileId[ctbAddrTs] for ctbAddrTs ranging from 0 to PicSizeInCtbsY−1, inclusive, specifying the conversion from a CTB address in tile scan to a tile ID, the list NumCtusInTile[tileIdx] for tileIdx ranging from 0 to PicSizeInCtbsY−1, inclusive, specifying the conversion from a tile index to the number of CTUs in the tile, the list FirstCtbAddrTs[tileIdx] for tileIdx ranging from 0 to NumTilesInPic−1, inclusive, specifying the conversion from a tile ID to the CTB address in tile scan of the first CTB in the tile, the lists ColumnWidthInLumaSamples[i] for i ranging from 0 to num_tile_columns_minus1, inclusive, specifying the width of the i-th tile column in units of luma samples, the list RowHeightInLumaSamples[j] for j ranging from 0 to num_tile_rows_minus1, inclusive, specifying the height of the j-th tile row in units of luma samples.

The values of ColumnWidthInLumaSamples[i] for i ranging from 0 to num_tile_columns_minus1, inclusive, and RowHeightInLumaSamples[j] for j ranging from 0 to num_tile_rows_minus1, inclusive, shall all be greater than 0.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to 1.

Tile Group Header Sematics tile_group_pic_parameter_set_id specifies the value of pps_pic_parameter_set_id for the PPS in use. The value of tile_group_pic_parameter_set_id shall be in the range of 0 to 63, inclusive.

tile_group_address specifies the tile address of the first tile in the tile group. The length of tile_group_address is Ceil(Log 2 (NumTilesInPic)) bits. The value of tile_group_address shall be in the range of 0 to NumTilesInPic−1, inclusive, and the value of tile_group_address shall not be equal to the value of tile_group_address of any other coded tile group NAL unit of the same coded picture. When tile_group_address is not present it is inferred to be equal to 0.

num_tiles_in_tile_group_minus1 plus 1 specifies the number of tiles in the tile group. The value of num_tiles_in_tile_group_minus1 shall be in the range of 0 to NumTilesInPic−1, inclusive. When not present, the value of num_tiles_in_tile_group_minus1 is inferred to be equal to 0.

tile_group_type specifies the coding type of the tile group according to Table 1.

TABLE 1

Name association to tile_group_type

| tile_group_type | Name of tile_group_type |
|---|---|
| 0 | B (B tile group) |
| 1 | P (P tile group) |
| 2 | I (I tile group) | offset_len_minus1 plus 1 specifies the length, in bits, of the entry_point_offset_minus1[i] syntax elements. The value of offset_len_minus1 shall be in the range of 0 to 31, inclusive.

entry_point_offset_minus1[i] plus 1 specifies the i-th entry point offset in bytes, and is represented by offset_len_minus1 plus 1 bits. The tile group data that follow the tile group header consists of num_tiles_in_tile_group_minus1+1 subsets, with subset index values ranging from 0 to num_tiles_in_tile_group_minus1, inclusive. The first byte of the tile group data is considered byte 0. When present, emulation prevention bytes that appear in the tile group data portion of the coded tile group NAL unit are counted as part of the tile group data for purposes of subset identification. Subset 0 consists of bytes 0 to entry_point_offset_minus1[0], inclusive, of the coded tile group data, subset k, with k in the range of 1 to numtiles_in_tile_group_minus1−1, inclusive, consists of bytes firstByte[k] to lastByte[k], inclusive, of the coded tile group data with firstByte[k] and lastByte[k] defined as:

$$firstByte[k] = \sum_{n=1}^{k} (entry\_point\_offset\_minus1[n-1]+1) \quad (10)$$

$$lastByte[k] = firstByte[k] + entry\_point\_offset\_minus1[k] \quad (11)$$

The last subset (with subset index equal to num_tiles_in_tile_group_minus1) consists of the remaining bytes of the coded tile group data.

Each subset shall consist of all coded bits of all CTUs in the tile group that are within the same tile.

HMVP (History Based Motion Vector Predictor)

Embodiments of the application may be configured to implement history based motion vector prediction, or in other words to process or code pictures using history based motion vector prediction as described in more detail below.

For example, in Versatile Video Coding (VVC), motion vectors of inter-coded blocks can be signaled in two ways: Advanced motion vector prediction (AMVP) mode or merge mode. With AMVP mode, a difference between the real motion vector and a motion vector prediction (MVP), a reference index and a MVP index referring to an AMVP candidate list are signaled. For the merge mode, a merge index referring to a merge candidate list is signaled and all the motion information associated with the merge candidate is inherited.

Figure 10:
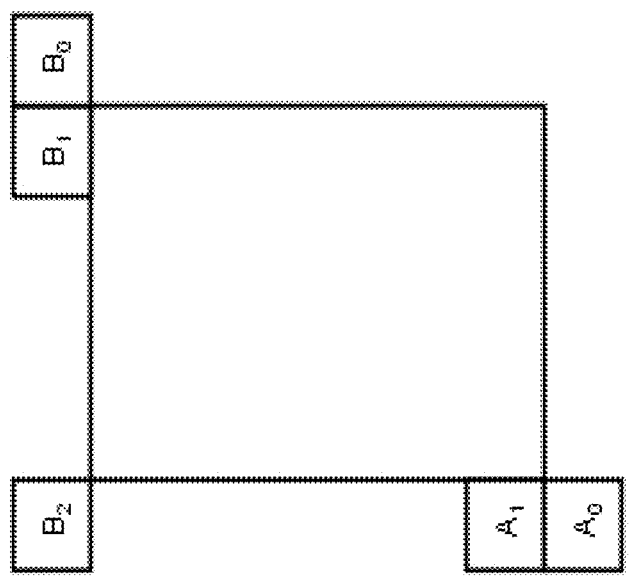
FIG. 10 shows an example of positions of spatial neighbouring blocks used in merge and AMVP candidate list construction.

For both the AMVP candidate list and the merge candidate list, the motion candidates are derived from temporally or spatially neighboring coded blocks. More specifically, the merge candidate list may be constructed by checking the following four types of merge MVP candidates in the following order:

1. Spatial merge candidates (from five spatial neighbouring blocks, as depicted in FIG. 10)
2. Temporal MVP (TMVP) merge candidates
3. Combined bi-predictive merging candidates
4. Zero motion vector merging candidates Once the number of available merge candidates reaches the signaled maximally allowed merge candidates (e.g., 5 in common test conditions), the merge candidate list construction process is terminated.

Similarly, for the AMVP candidate list, three types of MVP candidates are checked in the following order:

1. Up to two spatial MVP candidates (one from $B_0$, $B_1$, and $B_2$, and the other from $A_0$ and $A_1$, as depicted in FIG. 10)
2. Temporal MVP (TMVP)
3. Zero MVP candidates Thus, FIG. 10 illustrates positions of spatial neighboring blocks used in merge and AMVP candidate list construction.

Figure 11:
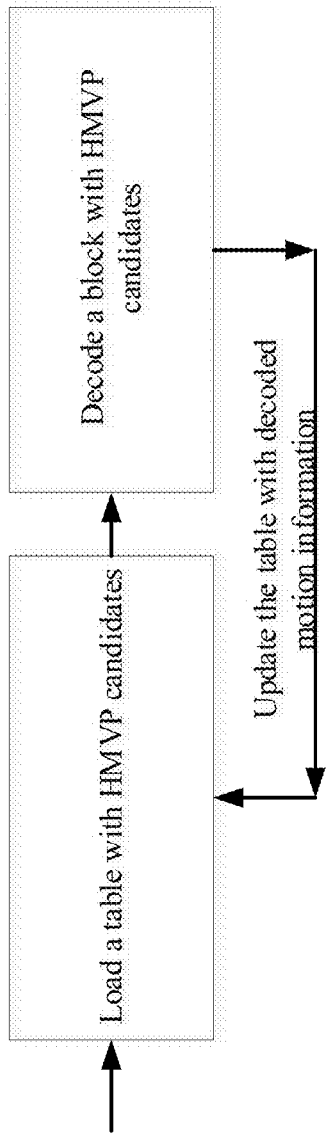
FIG. 11 shows flowchart for an example coding using HMVP.

In history-based MVP (HMVP) method a HMVP candidate is defined as the motion information of a previously coded block. A table with multiple HMVP candidates is maintained during the coding (i.e. encoding and/or decoding) process. Whenever there is an inter-coded block, the associated motion information is added to the last entry of the table as a new HMVP candidate. The overall coding flow is depicted in FIG. 11.

The HMVP table size (also referred to as length L) is set to a given value HMVPCand (HMVPCand can be a positive integer value for e.g. 16), which indicates that up to 16 HMVP candidates may be added to the table. If there are more than 16 HMVP candidates from the previously coded blocks, then, for example, a First in First out (FIFO) rule is applied so that the table always contains the latest previously coded 16 motion vector candidates. FIG. 12 illustrates an example of updating the HMVP table in the HMVP method. FIG. 12(*a*) depicts an example, wherein the FIFO rule is applied to remove a HMVP candidate and add a new one to the table used in the proposed method.

To further improve the coding efficiency, a constraint FIFO rule as shown in FIG. 12(*b*) is introduced, wherein when inserting a HMVP candidate to the table, a redundancy check is firstly applied to find whether there is an identical HMVP candidate in the table. If found, the identical HMVP candidate is removed from the table and all the HMVP candidates afterwards (in the order of the FIFO) are moved, i.e., their HMVP candidate table indices are reduced by 1.

HMVP candidates could be used in the merge candidate list construction process. All HMVP candidates from the last entry to the first entry in the table can be inserted, for example, after the TMVP candidate. Pruning is applied on the HMVP candidates. Once the total number of available merge candidates reaches the signaled maximally allowed merge candidates, the merge candidate list construction process is terminated.

Similarly, HMVP candidates could also be used in the AMVP candidate list construction process. The motion vectors of the last K HMVP candidates in the table are, for example, inserted after the TMVP candidate. Only HMVP candidates with the same reference picture as the AMVP target reference picture are used to construct the AMVP candidate list. Pruning is applied on the HMVP candidates. K can be set to an integer value which for e.g. can be 4.

In addition, when the total merge candidate number is larger than or equal to 15, a truncated unary plus fixed length (with 3 bits) binarization methods can be applied to code a merge index. With the total number of merge candidates denoted as $N_{mrg}$, the binarization method is tabulated in FIG. 15.

The merge candidate list derivation including the "HMVP tool" is generated using the following process:

This process is only invoked when merge_flag[xCb][yPb] is equal to 1, where (xCb, yCb) specify the top-left sample of the current luma coding block relative to the top-left luma sample of the current picture.

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples, the bi-prediction weight index gbiIdx.

Outputs of this process are:

the luma motion vectors in 1/16 fractional-sample accuracy mvL0[0][0] and mvL1[0][0], the reference indices refIdxL0 and refIdxL1, the prediction list utilization flags predFlagL0[0][0] and predFlagL1[0][0].

The bi-prediction weight index gbiIdx is set equal to 0.

The motion vectors mvL0[0][0] and mvL1[0][0], the reference indices refIdxL0 and refIdxL1 and the prediction utilization flags predFlagL0[0][0] and predFlagL1[0][0] are derived by the following ordered operations:

1. The derivation process for merging candidates from neighbouring coding units as specified in clause 8.3.2.3 is invoked with the luma coding block location (xCb, yCb), the luma coding block width cbWidth, and the luma coding block height cbHeight as inputs, and the output being the availability flags availableFlag$A_0$, availableFlag$A_1$, availableFlag$B_0$, availableFlag$B_1$ and availableFlag$B_2$, the reference indices refIdxLX$A_0$, refIdxLX$A_1$, refIdxLX$B_0$, refIdxLX$B_1$ and refIdxLX$B_2$, the prediction list utilization flags predFlagLX$A_0$, predFlagLX$A_1$, predFlagLX$B_0$, predFlagLX$B_1$ and predFlagLX$B_2$, and the motion vectors mvLX$A_0$, mvLX$A_1$, mvLX$B_0$, mvLX$B_1$ and mvLX$B_2$, with X being 0 or 1, and the bi-prediction weight indices gbiIdx$A_0$, gbiIdx$A_1$, gbiIdx$B_0$, gbiIdx$B_1$, gbiIdx$B_2$.

2. The reference indices, refIdxLXCol, with X being 0 or 1, and the bi-prediction weight index gbiIdxCol for the temporal merging candidate Col are set equal to 0.

3. The derivation process for temporal luma motion vector prediction as specified in clause 8.3.2.11 is invoked with the luma location (xCb, yCb), the luma coding block width cbWidth, the luma coding block height cbHeight and the variable refIdxL0Col as inputs, and the output being the availability flag availableFlagL0Col and the temporal motion vector mvL0Col. The variables availableFlagCol, predFlagL0Col and predFlagL1Col are derived as follows:

$$availableFlagCol = availableFlagL0Col \qquad (12)$$

$$predFlagL0Col = availableFlagL0Col \qquad (13)$$

$$predFlagL1Col = 0 \qquad (14)$$

4. When tilegroup_type is equal to B, the derivation process for temporal luma motion vector prediction as specified in clause 8.3.2.11 is invoked with the luma location (xCb, yCb), the luma coding block width cbWidth, the luma coding block height cbHeight and the variable refIdxL1Col as inputs, and the output being the availability flag availableFlagL0Col and the temporal motion vector mvL1Col. The variables availableFlagCol and predFlagL1Col are derived as follows:

$$availableFlagCol = availableFlagL0Col \| availableFlagL0Col \qquad (15)$$

$$predFlagL1Col = availableFlagL1Col \qquad (16)$$

5. The merging candidate list, mergeCandList, is constructed as follows:

$i=0$ if(availableFlag$A_1$)

mergeCandList[$i$++]=$A_1$ if(availableFlag$B_1$)

mergeCandList[$i$++]=$B_1$ if(availableFlag$B_0$)

mergeCandList[$i$++]=$B_0$ if(availableFlag$A_0$)

mergeCandList[$i$++]=$A_0$ if(availableFlag$B_2$)

mergeCandList[$i$++]=$B_2$ if(availableFlagCol)

mergeCandList[$i$++]=Col  (17)

6. The variable numCurrMergeCand and numOrigMergeCand are set equal to the number of merging candidates in the mergeCandList.

7. When numCurrMergeCand is less than (MaxNumMergeCand−1) and NumHmvpCand is greater than 0, the following applies:

The derivation process of history-based merging candidates as specified in the next section titled ("Derivation process for history-based merging candidates") is invoked with mergeCandList, and numCurrMergeCand as inputs, and modified mergeCandList and numCurrMergeCand as outputs.

numOrigMergeCand is set equal to numCurrMergeCand.

Derivation Process for History-Based Merging Candidates
Inputs to this process are:
a merge candidate list mergeCandList,
the number of available merging candidates in the list numCurrMergeCand.
Outputs to this process are:
the modified merging candidate list mergeCandList,
the modified number of merging candidates in the list numCurrMergeCand.
Each element of the array isPruned[i] with i=0 . . . numCurrMergeCand−1 is set equal to FALSE and the variable numOrigMergeCand is set equal to numCurrMergeCand.
For each candidate in HmvpCandList[hMvpIdx] with index hMvpIdx=1 . . . NumHmvpCand, the following ordered operations are repeated until numCurrMergeCand is equal to (MaxNumMergeCand−1):
1. The variable sameMotion is derived as follows:
If all of the following conditions are true for any i=0 . . . numOrigMergeCand−1, sameMotion and isPruned[i] are both set equal to TRUE:
The candidate HmvpCandList[NumHmvpCand−hMvpIdx] is equal to the merging candidate mergeCandList[i].
isPruned[i] is equal to FALSE.
Otherwise, sameMotion is set equal to FALSE.
2. When sameMotion is equal to FALSE, the candidate HmvpCandList[NumHmvpCand−hMvpIdx] is added to the merging candidate list as follows:

mergeCandList[numCurrMergeCand++]=HmvpCandList[NumHmvpCand−hMvpIdx]     (18)

The motion vector predictor candidate list derivation including the "HMVP tool" is generated using the following process:
Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples,
the reference index of the current coding unit partition refIdxLX, with X being 0 or 1.
Output of this process is motion vector predictor candidate list mvpListLX in 1/16 fractional-sample accuracy with X being 0 or 1.
The motion vector predictor candidate list mvpListLX with X being 0 or 1 is derived in the following ordered operations:
1. The derivation process for spatial motion vector predictor candidates from neighbouring coding unit partitions as specified in clause 8.3.2.10 is invoked with the luma coding block location (xCb, yCb), the luma coding block width cbWidth, the luma coding block height cbHeight and refIdxLX, with X being 0 or 1 as inputs, and the availability flags availableFlagLXN and the motion vectors mvLXN, with N being replaced by A or B, as output.
2. The rounding process for motion vectors as specified in clause 8.3.2.14 is invoked the with mvX set equal to mvLXN, with N being replaced by A or B, rightShift set equal to MvShift+2, and leftShift set equal to MvShift+2 as inputs and the rounded mvLXN, with N being replaced by A or B, as output.
3. If both availableFlagLXA and availableFlagLXB are equal to 1 and mvLXA is not equal to mvLXB, availableFlagLXCol is set equal to 0.
4. Otherwise, the following applies:
The derivation process for temporal luma motion vector prediction as specified in clause 8.3.2.11 is with the luma coding block location (xCb, yCb), the luma coding block width cbWidth, the luma coding block height cbHeight and refIdxLX, with X being 0 or 1 as inputs, and with the output being the availability flag availableFlagLXCol and the temporal motion vector predictor mvLXCol.
The rounding process for motion vectors as specified in clause 8.3.2.14 is invoked the with mvX set equal to mvLXCol, rightShift set equal to MvShift+2, and leftShift set equal to MvShift+2 as inputs and the rounded mvLXCol as output.
5. The motion vector predictor candidate list, mvpListLX, is constructed as follows:

```
numCurrMvpCand = 0
if( availableFlagLXA ) {
    mvpListLX[ numCurrMvpCand++ ] = mvLXA
    if( availableFlagLXB && ( mvLXA != mvLXB ) )
        mvpListLX[ numCurrMvpCand++ ] = mvLXB      (19)
} else if( availableFlagLXB )
    mvpListLX[ numCurrMvpCand++ ] = mvLXB
if( numCurrMvpCand < 2 && availableFlagLXCol )
    mvpListLX[ numCurrMvpCand++ ] = mvLXCol
```

6. When numCurrMvpCand is less than 2 and NumHmvpCand is greater than 0, the following applies for i=1 . . . Min(4, NumHmvpCand) until numCurrMvpCand is equal to 2:
For each reference picture list LY with Y=0 . . . 1, the following applies until numCurrMvpCand is equal to 2:
When all of the following conditions are true, mvpListLX[numCurrMvpCand++] is set to equal to the LY motion vector of the candidate HmvpCandList[NumHmvpCand−i]:
The LY reference index of the history-based motion vector predictor candidate HmvpCandList[i] is equal to refIdxLX
The motion vector predictor candidate list is empty (numCurrMvpCan is equal to 0) or the LY motion vector of the candidate HmvpCandList[NumHmvpCand−i] is not equal to mvpListLX[j] for j=0 . . . numCurrMvpCand−1.
The update of the history-based motion vector predictor list is specified in the section titled "update of history based motion vector predictor candidate list" and this process is carried after the motion information for a given coding unit is derived.

Update of History Based Motion Vector Predictor Candidate List:
Inputs to this process are:
luma motion vectors in 1/16 fractional-sample accuracy mvL0 and mvL1,
reference indices refIdxL0 and refIdxL1,
prediction list utilization flags predFlagL0 and predFlagL1.
The MVP candidate hMvpCand consists of the luma motion vectors mvL0 and mvL1, the reference indices refIdxL0 and refIdxL1, the prediction list utilization flags predFlagL0 and predFlagL1, and the bi-prediction weight index gbiIdx set equal to 0.

The candidate list HmvpCandList is modified using the candidate hMvpCand by the following ordered operations:
1. The variable identicalCandExist is set equal to FALSE and the variable removeIdx is set equal to 0.
2. When NumHmvpCand is greater than 0, for each index hMvpIdx with hMvpIdx=0 . . . NumHmvpCand−1, the following operations apply until identicalCandExist is equal to TRUE:
When hMvpCand is equal to HmvpCandList [hMvpIdx], identicalCandExist is set equal to TRUE and removeIdx is set equal to hMvpIdx.
3. The candidate list HmvpCandList is updated as follows:
If identicalCandExist is equal to TRUE or NumHmvp-Cand is equal to 6, the following applies:
For each index i with i=(removeIdx+1) . . . (NumHmvpCand−1), HmvpCandList[i−1] is set equal to HmvpCandList[i].
HmvpCandList[NumHmvpCand−1] is set equal to mvCand.
Otherwise (identicalCandExist is equal to FALSE and NumHmvpCand is less than 6), the following applies:
HmvpCandList[NumHmvpCand++] is set equal to mvCand.

The syntax for resetting the HMVP list at the beginning of a new tilegroup and beginning of each CTU row is exemplarily shown below in the table.

| tilegroup_data( ) { | Descriptor |
|---|---|
| do { | |
|   if ( ( ( CtbAddrInRs % PicWidthInCtbsY = = 0 ) \|\| | |
|   ( CtbAddrInRs = = tilegroup_address ) ) | |
|     NumHmvpCand = 0 | |
|   coding_tree_unit( ) | |
|   end_of_tilegroup_flag | ae(v) |
|   CtbAddrInRs++ | |
| } while( !end_of_tilegroup_flag ) | |
| } | |

At the beginning of new tilegroup, the HMVP list is reset using the following syntax, when CtbAddrinRs==tilegroup_address i.e. beginning of a new tilegroup, NumHmvpCand is set to zero.

At the beginning of each CTU row, the first CTU of each CTU row, the HMVP list is also reset. The syntax CtbAddrinRs % PicWidthInCtbsY==0 points to the first CTU of each CTU row and the HMVP list is reset by setting the variable NumHmvpCand to value 0.

Wave Front Parallel Processing (WPP)

Figure 13:
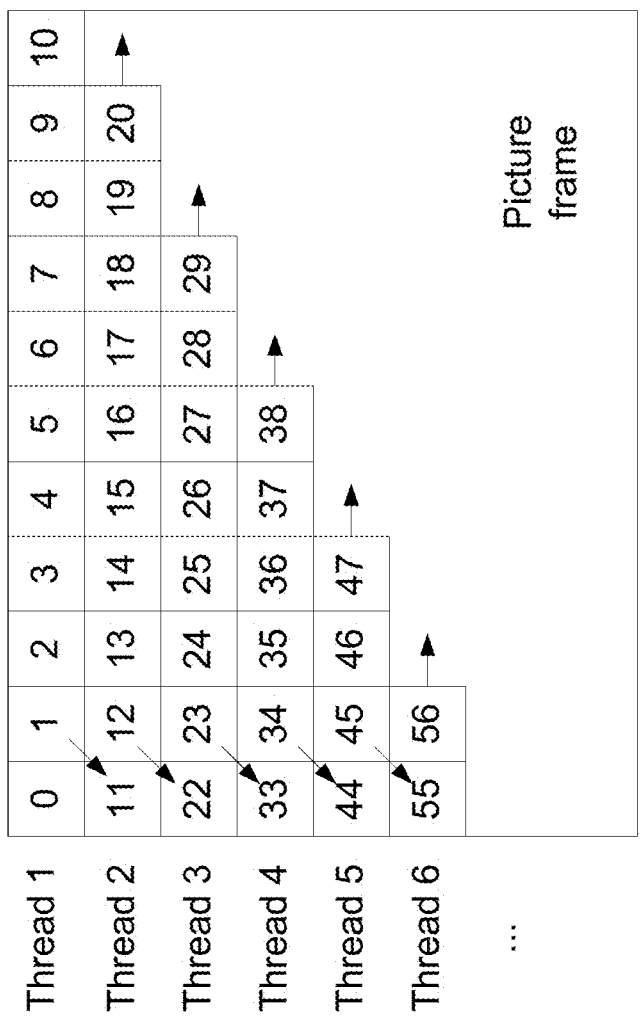
FIG. 13 shows an example of a Wavefront Parallel Processing (WPP).

In order to improve the processing efficiency, a processing called wavefront parallel processing (WPP) is introduced, where WPP mode allows rows of CTUs to be processed in parallel. In WPP mode each CTU row is processed relative to its preceding (immediate adjacent) CTU row by using a delay of, e.g., two (or 1 or 3 or more) consecutive CTUs. FIG. 13 illustrates wavefront parallel processing. For example, see FIG. 13, a picture is divided into CTUs, each thread (row) includes 11 CTUs, i.e., thread 1 includes CTU0 to CTU10, thread 2 includes CTU11 to CTU 21, thread 3 includes CTU22 to CTU32, thread 4 includes CTU33 TO 43 . . . Therefore, in WPP mode, when the encoding/decoding process of CTU1 in thread 1 is finished, the encoding/decoding process of CTU11 in thread 2 can start, similarly, when the encoding/decoding process of CTU12 in thread 2 is finished, the encoding/decoding process of CTU22 in thread 3 can start, when the encoding/decoding process of CTU23 in thread 3 is finished, the encoding/decoding process of CTU33 in thread 4 can start, when the encoding/decoding process of CTU34 in thread 4 is finished, the encoding/decoding process of CTU44 in thread 5 can start.

Embodiments of the application enable, e.g., parallel processing of CTUs in a picture when HMVP (history based motion vector prediction) is used. Embodiments of the application allow using tiles or tile groups in combination with HMVP.

A tile scan is defined as a sequential ordering of CTUs partitioning a picture in which the CTUs are ordered consecutively in CTU raster scan in a tile whereas tiles in a picture are ordered consecutively in a raster scan of the tile tiles of the picture. A tile group header is defined as a part of a coded tile group containing the data elements pertaining to the first or all tiles represented in the tile group.

Therefore, a given picture may contain one or more tile groups and each tile group may contain one more tiles. Tiles allows for parallel processing, e.g. parallel processing of different tile groups or tiles. At a finer granularity, wavefront parallel processing (WPP) or other tools which use, e.g., CTU row based parallelism, may additionally be used inside each tile of a given tile group to allow further parallel processing.

Embodiments of the current disclosure are configured, e.g., to reset the HMVP list at the beginning of new tile group and/or beginning of a new tile and/or beginning of each CTU row inside a given tile. Thus, parallel processing of CTUs is facilitated.

FIG. 6 shows a picture divided into three different tile groups and into 12 different tiles. HMVP tool maintains a list of motion vector candidates and is maintained and updated after processing of each coding block, thus one HMVP list is maintained that keeps getting updated until the last CTU of a CTU row, therefore wavefront parallel processing tool cannot be performed inside a given picture/tilegroup or a tile. Further explanations were already given, above.

FIG. 7 and FIG. 8 show the idea of re-setting the HMVP list at the beginning of each CTU row for the case of tile groups and tiles.

FIG. 7 relates to the explanations provided for FIG. 6. That is the number of tiles, the three tile groups and the tile Group scan order, i.e. raster scan across tiles, correspond to those already explained for FIG. 6. FIG. 7 further also shows a raster scan within the tile, as indicated by the solid arrow indicated the CTU scan order within the tile. In addition to FIG. 6, FIG. 7 indicates HMVP List reset by respective arrows, for Tile 1, Tile 2, and Tile 3 of FIG. 7.

For FIG. 7, an HMVP list reset is performed for all of the combinations below:
At the beginning of each tile group (equivalent of beginning of slice)
At the beginning of each tile inside a tile group
At the first CTU for each CTU row inside a give tile.

A first alternative of a possible syntax specification is provided below in the table. The procedure tile_group_data consists of the coded data of all the tiles belonging to a given tile group. The for loop "for(i=0; i<=num_tiles_in_tile_group_minus1; 1++, tileIdx++)" iterates over all the tiles in a given tile group and the for loop "for(j=0; j<NumCtusInTile[tileIdx]; j++, ctbAddrInTs++)" iterates over all the CTUs inside a given tile.

```
tile_group_data( ) {                                              Descriptor
    tileIdx = tile_group_address
    for( i = 0; i <= num_tiles_in_tile_group_minus1; i++, tileIdx++ ) {
        ctbAddrInTs = FirstCtbAddrTs[ tileIdx ]
        for( j = 0; j < NumCtusInTile[ tileIdx ]; j++, ctbAddrInTs++ ) {
            CtbAddrInRs = CtbAddrTsToRs[ ctbAddrInTs ]
            FirstCtbInCtuRowInTile = ((ctbAddrInTs - FirstCtbAddrTs[ tileIdx ] -
NumCtusInTile[tileIdx] ) % ColWidth[tileIdx] = = 0) ? 1: 0
If (( tile_group_type != I) && (FirstCtbInCtuRowInTile))
    HMVPCandNum = 0
        coding_tree_unit( )
    }
    end_of_tile_one_bit /* equal to 1 */                          ae(v)
    if( i < num_tiles_in_tile_group_minus1 )
        byte_alignment( )
    }
}
```

This syntax specification is shown in FIG. 8. That is, FIG. 8 indicates a possible syntax specification for HMVP list reset for tile groups, tiles and CTU rows inside Tiles.

A second alternative of a syntax to reset the HMVP list (for example, at the beginning of each CTU row inside a Tile), is provided below:

```
tile_group_data( ) {                                              Descriptor
    tileIdx = tile_group_address
    for( i = 0; i <= num_tiles_in_tile_group_minus1;
    i++, tileIdx++ ) {
        ctbAddrInTs = FirstCtbAddrTs[ tileIdx ]
        for( j = 0; j < NumCtusInTile[ tileIdx ]; j++,
        ctbAddrInTs++ ) {
            if ( j % ColWidth[tileIdx] == 0 )
                HMVPCandNum = 0
            CtbAddrInRs = CtbAddrTsToRs[ ctbAddrInTs ]
            coding_tree_unit( )
        }
        end_of_tile_one_bit /* equal to 1 */                      ae(v)
        if( i < num_tiles_in_tile_group_minus1 )
            byte_alignment( )
    }
}
```

This alternative is shown in FIG. 14. That is, FIG. 14 illustrates another possible syntax specification for HMVP list reset for tile groups, tiles and CTU rows inside Tiles.

Figure 9:
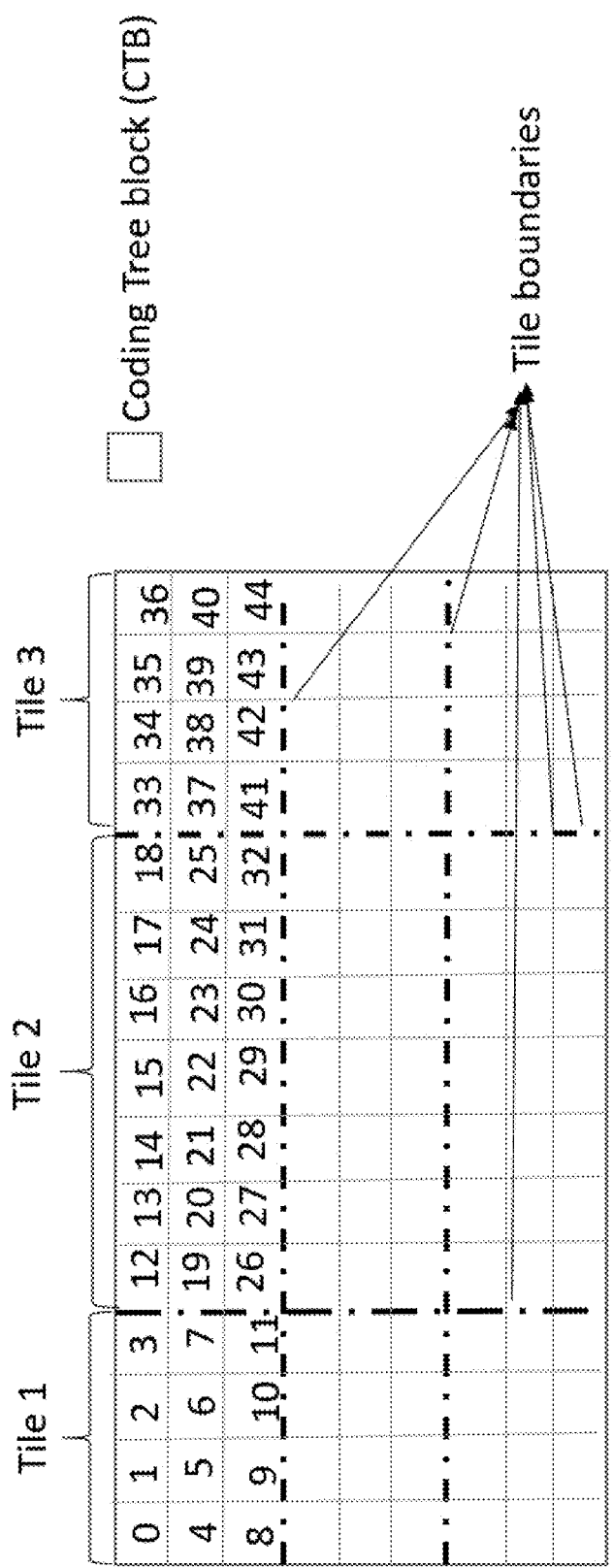
FIG. 9 shows an HMVP list reset for tile groups, tiles and CTU rows inside of tiles.

FIG. 9 gives an example where three different tiles are shown which are spaced non-uniformly (e.g. have different sizes). FIG. 9 may be compared to FIGS. 5 and 6. Whereas FIGS. 5 and 6 show tile groups, TGs, with respect to a raster scan order, FIG. 9 shows a rectangular TG and illustrates Tile boundaries, given by dashed-dotted lines. FIG. 9 further illustrates Coding Tree Blocks, CTBs.

FIG. 9 illustrates HMVP list reset for tile groups, tiles, CTU row beginning inside each tile.

The HMVP list is reset, for example, based on the formula specified in the syntax table above which is

```
FirstCtbInCtuRowInTile = ((ctbAddrInTs - FirstCtbAddrTs[ tileIdx ] -
NumCtusInTile[tileIdx] )
% ColWidth[tileIdx] == 0) ? 1: 0
If (( tile_group_type != I) && (FirstCtbInCtuRowInTile))
{
HMVPCandNum = 0
}
```

The variable FirstCtbInCtuRowInTile is only set to true, when the ctbAddrInTs of a given CTU is equal to the beginning of a tile group or a tile or when the address of the given CTU is the same as the first CTU of a given CTU row inside a tile. The expression HMVPCandNum=0 is used to initialize or re-set the HMVP list. HMVPCandNum is set to zero when the variable FirstCtbInCtuRowInTile is set to true.

Applying the formula for Tile 1 in FIG. 9, gives the following result. Tile 1 of FIG. 9 consists of 12 CTUs in total, numbered 0-11. it has ColWidth of 4 CTBs and the FirstCtbAddrTs value is 0.

Therefore the value of FirstCtbInCtuRowInTile is 1 for the CTBs 0, 4, 8 and therefore the HMVP list is reset for these CTBs.

Tile 2 of FIG. 9 consists of 21 CTBs and the ColWidth is 7 CTBs and the FirstCtbAddrTs value is 12.

Therefore the value of FirstCtbInCtuRowInTile is 1 for the CTBs 12, 19, 26 and therefore the HMVP list is reset for these CTBs.

Similarly for Tile 3 of FIG. 9, It consists of 12 CTUs in total, it has ColWidth of 4 CTBs and the FirstCtbAddrTs value is 33.

Therefore the value of FirstCtbInCtuRowInTile is 1 for the CTBs 33, 37, 41 and therefore the HMVP list is reset for these CTBs.

Therefore by re-setting (or in other words "intializing") the HMVP list at the beginning of each CTU row inside a tile (first CTU), operation of tools like wavefronts or similar parallel processing can be realized.

An alternative syntax to reset the HMVP list at the beginning of each CTU row inside a Tile, is provided below

```
tile_group_data( ) {                                              Descriptor
    tileIdx = tile_group_address
    for( i = 0; i <= num_tiles_in_tile_group_minus1;
    i++, tileIdx++ ) {
        ctbAddrInTs = FirstCtbAddrTs[ tileIdx ]
        for( j = 0; j < NumCtusInTile[ tileIdx ]; j++,
        ctbAddrInTs++ ) {
            FirstCtbInCtuRowInTile =
            ( j % ColWidth[tileIdx] == 0) ? 1: 0
                If (( tile_group_type != I) &&
                (FirstCtbInCtuRowInTile))
                    HMVPCandNum = 0
            CtbAddrInRs = CtbAddrTsToRs[ ctbAddrInTs ]
                coding_tree_unit( )
        }
```

-continued

| tile_group_data( ) {                                                                                                                                                 | Descriptor |
|---|---|
|     end_of_tile_one_bit /* equal to 1 */<br>    if( i < num_tiles_in_tile_group_minus1 )<br>        byte_alignment( )<br>    }<br>} | ae(v) |

An alternative syntax to reset the HMVP list (for example, at the beginning of each CTU row inside a Tile) is provided below:

| tile_group_data( ) {                                                                                                                                                 | Descriptor |
|---|---|
|   tileIdx = tile_group_address<br>  for( i = 0; i <= num_tiles_in_tile_group_minus1;<br>  i++, tileIdx++ ) {<br>    ctbAddrInTs = FirstCtbAddrTs[ tileIdx ]<br>    for( j = 0; j < NumCtusInTile[ tileIdx ]; j++,<br>    ctbAddrInTs++ ) {<br>      if ( j % ColWidth[tileIdx] == 0 )<br>        HMVPCandNum = 0<br>      CtbAddrInRs = CtbAddrTsToRs[ ctbAddrInTs ]<br>      coding_tree_unit( )<br>    }<br>    end_of_tile_one_bit /* equal to 1 */<br>    if( i < num_tiles_in_tile_group_minus1 )<br>        byte_alignment( )<br>  }<br>} | <br><br><br><br><br><br><br><br><br><br><br>ae(v) |

The HMVP list is initialized or reset using the following formula:

FirstCtbInCtuRowInTile=(j % ColWidth[tileIdx]==0)
?1:0

If((tile_group_type !=I)&&(FirstCtbInCtuRowIn-
Tile))

HMVPCandNum=0

The variable FirstCtbInCtuRowInTile is only set to true, when the ctbAddrInTs of a given CTU (variable j) is equal to the beginning of a tile group or a tile or when the address of the given CTU is the same as the first CTU of a given CTU row inside a tile. The expression (j % ColWidth [tileIdx]==0) checks if the address of the CTU is the same as the address of the first CTU of a given CTU row inside a Tile. The expression HMVPCandNum=0 is used to initialize or re-set the HMVP list. HMVPCandNum is set to zero when the variable FirstCtbInCtuRowInTile is set to true.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory, or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The present disclosure comprises the following further aspects, wherein the numbering does not necessarily coincide with the numbering used in other parts of the application.

A first aspect of a method of coding a picture implemented by a decoding device, comprising: initializing (or constructing) an HMVP (History Based Motion Vector Prediction) list for a current CTU row within a tile of a picture; and processing a CTU of the current CTU row based on the initialized HMVP list.

A second aspect of a method according to the first aspect, wherein the HMVP list for the current CTU row is initialized as follows: resetting (or emptying) the HMVP list for the current CTU row; and/or setting default values for the HMVP list for the current CTU row; and/or initializing the HMVP list for the current CTU row based on an HMVP list of a CTU of a previous CTU row in coding and/or scanning order (i.e. previous refers to the coding and/or scanning order; in an embodiment the previous CTU row may be the immediately preceding CTU row in the coding and/or scanning order, e.g. be spatially adjacent or a direct neighbor CTU row of the current CTU row).

A third aspect of a method according to the first or second aspect, wherein the initializing (e.g. resetting) the HMVP list for the current CTU row is performed at the beginning of a tile group (TG), at the beginning of a tile, or at the beginning of each CTU row of a tile.

A fourth aspect of a method according to any one of the first to third aspect, wherein the initializing (e.g. resetting) the HMVP list for the current CTU row is performed when (e.g. before) a first CTU in the current CTU row in coding and/or scanning order is processed (e.g. coded), wherein the first CTU in the current CTU row is or comprises: the first CTU in a tile group (TG) in coding and/or scanning order; and/or the first CTU in a tile in coding and/or scanning order; and/or the first CTU in a CTU row in coding and/or scanning order. Wherein resetting the HMVP list for the first CTU in a tile (e.g. for the first CTU of each tile) allows to process or code tiles in parallel. Resetting the HMVP list for the first CTU in a CTU row (e.g. for the first CTU of each CTU row in a tile) allows for parallel processing of individual CTU rows within the same tile. It has been found that in particular for larger CTUs a reset for each CTU row may have only negligible impact on compression performance but allows to reduce processing or coding time.

A fifth aspect of a method according to any one of the first to fourth aspect, wherein the initializing (e.g. the resetting) the HMVP list for the current CTU row is performed for each CTU row in a tile when (e.g. before) the first CTU in the respective CTU row is processed (e.g. coded), e.g. before a first block (e.g. a CB, e.g. a first leafnode CB) of the first CTB (e.g. a luma or chroma CTB) of the first CTU in coding order is processed or coded).

A sixth aspect of a method according to any one of the first to fifth aspect, wherein the initializing the HMVP list for the current CTU row comprises resetting the HMVP list for the current CTU row, and wherein the resetting the HMVP list for the current CTU row comprises: setting a length (or length indicator or length parameter, e.g. HMVPCandNum) of the HMVP list to zero (e.g. HMVPCandNum=0) for processing (e.g. coding) the first CTU in the current CTU row in coding or scanning order, wherein resetting the HMVP list by setting the length of the HMVP list to zero (and just enlarge the HMVP list step-by-step) allows to reduce the number of candidates that are checked for the prediction of the blocks to be coded compared to having a full-length (i.e. maximum length) HMVP list.

A seventh aspect of a method according to the sixth aspect, wherein the resetting the HMVP list for the current CTU row further comprises: incrementing the length of the HMVP list by one when a block (e.g. a first block or a consecutive block; a block may be a CTB or a CB, e.g. a leafnode CB) of the first CTU is coded using a motion vector (i.e. is inter-coded) and adding the motion vector to the HMVP list.

An eighth aspect of a method according to the seventh aspect, wherein the length of the HMVP list is only incremented and the motion vector is only added if the motion information (e.g. comprising a motion vector, a reference picture index) is not already contained in the HMVP list (pruning embodiment).

A ninth aspect of a method according to any one of the sixth to eighth aspect, wherein the length of the HMVP list is only incremented until a maximum length of the HMVP list is reached.

A tenth aspect of a method according to any one of the sixth to ninth aspects, wherein the method further comprises: coding a current block (e.g. CTB or CB) of the current CTU only considering a reduced number of HMVP list candidates according to a current length of the HMVP list, which is smaller than a maximum length of the HMVP list (wherein, e.g. the reduced number of HMVP list candidates corresponds to or is equal to the current length of the HMVP list).

An eleventh aspect of a method according to any of the second to tenth aspect, wherein the HMVP list is reset for each CTU row in a tile irrespective of a size of the tile.

A twelfth aspect of a method according to any one of the second to tenth aspects, wherein the HMVP list is reset for each CTU row in a tile when a size of the tile is greater than (or greater than or equal to) a threshold size, and/or wherein the HMVP list is not reset for each CTU row in a tile when a size of the tile is smaller than (or smaller than or equal to) the threshold size.

A thirteenth aspect of a method according to any one of the second to twelfth aspect, wherein the setting default values for the HMVP list for the current CTU row comprises: populating a MV of the HMVP list as a MV of a Uni-prediction manner, wherein the MV of Uni-prediction manner is either a zero motion vector or not a zero motion vector, wherein reference pictures comprise the first reference picture in L0 list; and/or Populating a MV of the HMVP list as a MV of Bi-prediction manner, wherein the MV of Bi-prediction manner is either a zero motion vector or not a zero motion vector, wherein reference pictures comprises the first reference picture in L0 list and the first reference picture in L1 list.

A fourteenth aspect of a method according to any one of the second to twelfth aspect, wherein each co-located picture may store a temporal HMVP list for each CTU row or for the whole picture, wherein the setting default values for the HMVP list for the current CTU row comprises: initializing the HMVP list for the current CTU row based on the temporal HMVP list.

A fifteenth aspect of a method according to any one of the second to twelfth aspect, wherein the previous CTU row is the CTU row immediate adjacent to the current CTU row and in the top of the current CTU row.

A sixteenth aspect of a method according to the fifteenth aspect, wherein the CTU of the previous CTU row is the second CTU of the previous CTU row.

A seventeenth aspect of a method according to the fifteenth aspect, wherein the CTU of the previous CTU row is the first CTU of the previous CTU row.

An eighteenth aspect of a method of coding a picture implemented by an encoding device, comprising: initializing (or constructing) a HMVP list for a current CTU row within a tile of a picture; and processing a CTU of the current CTU row based on the constructed/initialized HMVP list.

A nineteenth aspect of a method according to the eighteenth aspect, wherein the HMVP list for the current CTU row is initialized as follows: resetting (or emptying) the HMVP list for the current CTU row; and/or setting default values for the HMVP list for the current CTU row; and/or constructing/initializing the HMVP list for the current CTU row based on a HMVP list of a CTU of a previous CTU row in coding and/or scanning order (i.e. previous refers to the coding and/or scanning order; in an embodiment the previous CTU row may be the immediately preceding CTU row in the coding and/or scanning order, e.g. be spatially adjacent or a direct neighbor CTU row of the current CTU row).

A twentieth aspect of a method according to the eighteenth or nineteenth aspect, wherein the initializing (e.g. resetting) the HMVP list for the current CTU row is performed at the beginning of a tile group (TG), at the beginning of a tile, or at the beginning of each CTU row of a tile.

A twenty-first aspect of a method according to any one of the eighteenth to twentieth aspect, wherein the initializing (e.g. resetting) the HMVP list for the current CTU row is performed when (e.g. before) a first CTU in the current CTU row in coding and/or scanning order is processed (e.g. coded), wherein the first CTU in the current CTU row is or comprises: the first CTU in a tile group (TG) in coding and/or scanning order, and/or the first CTU in a tile in coding and/or scanning order; and/or the first CTU in a CTU row in coding and/or scanning order.

A twenty-second aspect of a method according to any one of the eighteenth to twenty-first aspect, wherein the initializing (e.g. the resetting) the HMVP list for the current CTU row is performed for each CTU row in a tile when (e.g. before) the first CTU in the respective CTU row is processed (e.g. coded), e.g. before a first block (e.g. a CB, e.g. a first leafnode CB) of the first CTB (e.g. a luma or chroma CTB) of the first CTU in coding order is processed or coded).

A twenty-third aspect of a method according to any one of the eighteenth to twenty-second aspect, wherein the initializing the HMVP list for the current CTU row comprises resetting the HMVP list for the current CTU row, and wherein the resetting the HMVP list for the current CTU row comprises: setting a length (or length indicator or length parameter, e.g. HMVPCandNum) of the HMVP list to zero (e.g. HMVPCandNum=0) for processing (e.g. coding) the first CTU in the current CTU row in coding or scanning order.

A twenty-fourth aspect of a method according to the twenty-third aspect, wherein the resetting the HMVP list for the current CTU row further comprises: incrementing the length of the HMVP list by one when a block (e.g. a first block or a consecutive block; a block may be a CTB or a CB, e.g. a leafnode CB) of the first CTU is coded using a motion vector (i.e. is inter-coded) and adding the motion vector to the HMVP list.

A twenty-fifth aspect of a method according to the twenty-fourth aspect, wherein the length of the HMVP list is only incremented and the motion vector is only added if the motion information (e.g. comprising a motion vector, a reference picture index) is not already contained in the HMVP list (pruning embodiment).

A twenty-sixth aspect of a method according to any one of the twenty-third to twenty-fifth aspect, wherein the length of the HMVP list is only incremented until a maximum length of the HMVP list is reached.

A twenty-seventh aspect of a method according to any one of the twenty-third to twenty-sixth aspect, wherein the method further comprises: coding a current block (e.g. CTB or CB) of the current CTU only considering a reduced number of HMVP list candidates according to a current length of the HMVP list, which is smaller than a maximum length of the HMVP list (wherein, e.g. the reduced number of HMVP list candidates corresponds to or is equal to the current length of the HMVP list).

A twenty-eighth aspect of a method according to any one of the nineteenth to twenty-seventh aspect, wherein the HMVP list is reset for each CTU row in a tile irrespective of a size of the tile.

A twenty-ninth aspect of a method according to any one of the nineteenth to twenty-seventh aspect, wherein the HMVP list is reset for each CTU row in a tile when a size of the tile is greater than (or greater than or equal to) a threshold size, and/or wherein the HMVP list is not reset for each CTU row in a tile when a size of the tile is smaller than (or smaller than or equal to) the threshold size.

A thirtieth aspect of a method according to any one of the nineteenth to twenty-ninth aspect, wherein the setting default values for the HMVP list for the current CTU row comprises: populating a MV of the HMVP list as a MV of Uni-prediction manner, wherein the MV of Uni-prediction manner is either a zero motion vector or not a zero motion vector, wherein reference pictures comprises the first reference picture in L0 list; and/or populating a MV of the HMVP list as a MV of Bi-prediction manner, wherein the MV of Bi-prediction manner is either a zero motion vector or not a zero motion vector, wherein reference pictures comprises the first reference picture in L0 list and the first reference picture in L1 list.

A thirty-first aspect of a method according to any one of the nineteenth to twenty-ninth aspect, wherein each co-located picture may store a temporal HMVP list for each CTU row or for the whole picture, wherein the setting default values for the HMVP list for the current CTU row comprises: initializing/constructing the HMVP list for the current CTU row based on the temporal HMVP list.

A thirty-second aspect of a method according to any one of the nineteenth to twenty-ninth aspect, wherein the previous CTU row is the CTU row immediate adjacent to the current CTU row and in the top of the current CTU row.

A thirty-third aspect of a method according to the thirty-second aspect, wherein the CTU of the previous CTU row is the second CTU of the previous CTU row.

A thirty-fourth aspect of a method according to the thirty-second aspect, wherein the CTU of the previous CTU row is the first CTU of the previous CTU row.

A thirty-fifth aspect of an encoder (20) comprising processing circuitry for carrying out the method according to any one of the nineteenth to thirty-fourth aspect.

A thirty-sixth aspect of a decoder (30) comprising processing circuitry for carrying out the method according to any one of the first to seventeenth aspect.

A thirty-seventh aspect of a computer program product comprising a program code for performing the method according to any one of the first to thirty-fourth aspect.

A thirty-eighth aspect of a decoder, comprising: one or more processors; and a non-transitory computer-readable storage medium coupled to the processors and storing programming for execution by the processors, wherein the programming, when executed by the processors, configures the decoder to carry out the method according to any one of the first to seventeenth aspect.

A thirty-ninth aspect of an encoder, comprising: one or more processors; and a non-transitory computer-readable storage medium coupled to the processors and storing programming for execution by the processors, wherein the programming, when executed by the processors, configures the encoder to carry out the method according to any one of the nineteenth to thirty-fourth aspect.

What is claimed is:

1. A method of coding a picture implemented by a decoding device, comprising:
    initializing a history based motion vector prediction (HMVP) list for a current coding tree unit (CTU) row within a tile of a picture; and
    processing a CTU of the current CTU row based on the initialized HMVP list, wherein initializing the HMVP list for the current CTU row comprises:
    resetting the HMVP list for the current CTU row, and wherein the HMVP list is reset for each CTU row in a tile irrespective of a size of the tile.

2. The method according to claim 1, wherein the initializing the HMVP list for the current CTU row comprises resetting the HMVP list for the current CTU row, and wherein the resetting the HMVP list for the current CTU row comprises:
    setting a length of the HMVP list to zero for processing a first CTU in the current CTU row in a coding or scanning order.

3. The method according to claim 2, wherein the length of the HMVP list is only incremented until a maximum length of the HMVP list is reached.

4. The method according to claim 2, wherein the method further comprises:
    coding a current block of a current CTU by only considering a reduced number of HMVP list candidates according to a current length of the HMVP list, wherein the current length of the HMVP list is smaller than a maximum length of the HMVP list.

5. The method according to claim 4, wherein the reduced number of HMVP list candidates corresponds to the current length of the HMVP list.

6. The method according to claim 1, wherein the initializing the HMVP list for the current CTU row comprises resetting the HMVP list for the current CTU row, wherein resetting the HMVP list for a first CTU in a tile allows tiles to be processed or coded in parallel.

7. The method according to claim 6, wherein the initializing the HMVP list for the current CTU row comprises resetting the HMVP list for the current CTU row, wherein resetting the HMVP list for the first CTU of each tile allows tiles to be processed or coded in parallel.

8. The method according to claim 1, wherein the initializing the HMVP list for the current CTU row is performed for each CTU row in a tile before a first CTU in the respective CTU row is processed.

9. The method according to claim 8, wherein the resetting the HMVP list for the current CTU row further comprises:
    incrementing a length of the HMVP list by one when a block of the first CTU is inter-coded using a motion vector and adding the motion vector to the HMVP list.

10. The method according to claim 9, wherein the length of the HMVP list is only incremented and the motion vector is only added if motion information is not already contained in the HMVP list.

11. The method according to claim 10, wherein the motion information comprises at least one of a motion vector and a reference picture index.

12. The method according to claim 1, wherein a CTU in a CTU row has a corresponding address, wherein the address of a first CTU in a CTU row is identified by determining a first coding tree block (CTB) in a CTU row in a tile by using expression:

$$FirstCtbInCtuRowInTile=((ctbAddrInTs-FirstCtbAddrTs[tileIdx]-NumCtusInTile[tileIdx])\%ColWidth[tileIdx]==0)?1:0,$$

If ((tile_group_type !=I) && (FirstCtbInCtuRowInTile)) HMVPCandNum=0 where FirstCtbInCtuRowInTile denotes the first CTU in a CTU row in the tile, ctbAddrInTx denotes an address of a CTB in a tile, FirstCtbAddrTs denotes a first address of a CTB in a tile, tileIdx denotes an index of the respective tile, NumCtusInTile denotes a number of CTUs in a tile, ColWidth denotes a width of the tile in terms of number of CTUs, and "%" is a modulus operator; and tile_groupe_type denotes a type of tile group.

13. The method according to claim 1, wherein a CTU in a CTU row has a corresponding address, wherein an address of a first CTU in a CTU row is identified by determining whether a modulus operation of the address j with respect to a current tile yields zero by using expression:

$$if(j \% ColWidth[tileIdx]==0),$$

where J is the address of a current CTU and ColWidth[tileIdx] indicates a width of the tile in terms of number of CTUs, tileIdx denotes an index of the respective tile, and "%" is a modulus operator.

14. The method according to claim 1, wherein a CTU in a CTU row has a corresponding address, wherein an address of a first CTU in each CTU row inside a tile is identified by determining whether an address of a current CTU is same as an address of a CTU in a list or array storing an address of a left tile column boundary in units of CTBs, such that the first CTU of each CTU row inside a tile is deduced.

15. The method according to claim 14, wherein the determining whether an address of the current CTU is the same as an address of a CTU in the list storing an address of the left tile column boundary in units of CTBs uses expression:

$$if(CtbAddrX==CtbToTileColBd[CtbAddrX]),$$

where list or array CtbToTileColBd[ctbAddrX] includes conversion from a horizontal CTB address to an address of a left tile column boundary in units of CTBs, for "ctbAddrX" ranging from "0 to PicWidthInCtbsY", inclusively, where ctbAddrX indicates an index of a horizontal CTB.

16. A method of coding a picture implemented by an encoding device, comprising:
    initializing a history based motion vector prediction (HMVP) list for a current coding tree unit (CTU) row within a tile of a picture; and
    processing a CTU of the current CTU row based on the initialized HMVP list, wherein initializing the HMVP list for the current CTU row comprises:
    resetting the HMVP list for the current CTU row, and wherein the HMVP list is reset for each CTU row in a tile irrespective of a size of the tile.

17. A computer-readable non-transitory medium storing a program, including instructions which when executed on a processor cause the processor to perform the method according to claim 1.

18. A decoder, comprising:
    one or more processors; and
    a non-transitory computer-readable storage medium coupled to the one or more processors and storing instructions for execution by the one or more processors, wherein the instructions, when executed by the one or more processors, configures the decoder to carry out the method according to claim 1.

19. An encoder, comprising:
one or more processors; and
a non-transitory machine-readable storage medium coupled to the one or more processors and storing instructions for execution by the one or more processors, wherein the instructions, when executed by the one or more processors, configures the encoder to carry out the method according to claim 16.

\* \* \* \* \*